(12) United States Patent
Okabe et al.

(10) Patent No.: US 6,545,827 B1
(45) Date of Patent: Apr. 8, 2003

(54) OPTICAL SHEET

(75) Inventors: Motohiko Okabe, Wakayama (JP); Masakazu Uekita, Wakayama (JP)

(73) Assignee: Keiwa, Inc., Osaka (JP)

( * ) Notice: Subject to any disclaimer, the term of this patent is extended or adjusted under 35 U.S.C. 154(b) by 0 days.

(21) Appl. No.: 09/667,873

(22) Filed: Sep. 22, 2000

(30) Foreign Application Priority Data

Sep. 24, 1999 (JP) .......................................... 11-270010
Jul. 5, 2000 (JP) ....................................... 2000-203932

(51) Int. Cl.[7] .............................. F21V 5/02; G02B 5/04
(52) U.S. Cl. ....................... 359/837; 359/831; 359/625; 362/31; 362/330; 362/331; 362/339
(58) Field of Search ................................ 359/831, 837, 359/625; 349/61, 62, 65; 385/146, 36; 362/31, 26, 330, 331, 339

(56) References Cited

U.S. PATENT DOCUMENTS

| | | | | |
|---|---|---|---|---|
| 5,548,670 A | * | 8/1996 | Koike | 385/146 |
| 5,712,694 A | * | 1/1998 | Taira et al. | 349/175 |
| 6,027,220 A | * | 2/2000 | Arai | 362/19 |
| 6,086,211 A | * | 7/2000 | Ohkawa | 362/31 |
| 6,124,906 A | * | 9/2000 | Kawada et al. | 349/62 |
| 6,147,725 A | * | 11/2000 | Yuuki et al. | 349/65 |
| 6,239,851 B1 | * | 5/2001 | Hatazawa et al. | 349/65 |
| 6,275,338 B1 | * | 8/2001 | Arai et al. | 349/65 |
| 6,276,803 B1 | * | 8/2001 | Aoyama et al. | 353/38 |

FOREIGN PATENT DOCUMENTS

| | | |
|---|---|---|
| JP | 7-318709 A1 | 12/1995 |
| JP | 8-271887 A  * | 10/1996 |
| JP | 10-293212 | 11/1998 |
| KR | 1999-63956 A1 | 7/1999 |
| TW | 350921 | 1/1999 |
| WO | WO 97/140-75 | 4/1997 |

* cited by examiner

Primary Examiner—John Juba, Jr.
(74) Attorney, Agent, or Firm—Marshall, Gerstein & Borun

(57) ABSTRACT

An optical sheet to be used for a back light unit of a liquid crystal display having at least a lamp and a light guiding plate has the following structure. The optical sheet is constituted by a lower base portion and an upper fitting portion which are fitted each other in a vertical direction with less margin, and the base portion and the fitting portion are formed of materials having different refractive indices. The base portion is provided with a large number of triangular portions having a triangular sectional shape in parallel, the triangular portion having a first side surface positioned on the left side and a second side surface positioned on the right side. Moreover, the first side surface of the triangular portion has an angle which is equal to or greater than an angle formed between a direction taking a peak of a ray refracted and incident on an inside of the base portion through a light guiding plate and the transverse direction. Furthermore, a direction taking a peak of a ray refracted and incident on the fitting portion through the second side surface of the base portion is caused to more approach a just upward direction than a direction taking a peak of a ray transmitted to the second side surface through the inside of the base portion.

17 Claims, 12 Drawing Sheets

OPTICAL SHEET

TECHNICAL FIELD

The present invention relates to an optical sheet to be used for a liquid crystal display.

BACKGROUND ART

A back light unit comprising a light source and a member for collecting a ray emitted from the light source in a screen of a liquid crystal display is incorporated in the liquid crystal display. More specifically, the ray emitted from the light source are guided to the screen of the liquid crystal display by a light guiding plate provided adjacently to the light source and other optical sheets so that the screen can be displayed clearly.

FIG. 12 shows a schematic structure of a conventional back light unit 40 according to an example.

In FIG. 12, an arrow A indicates a longitudinal direction, an arrow B indicates a transverse direction and an arrow C indicates a vertical direction. As shown in FIG. 12, the back light unit 40 comprises a lamp 41 to be a light source, a light guiding plate 42 provided such that the lamp 41 is positioned on the outside of a left end thereof, a light diffusing sheet 43 to be an optical sheet provided on the upside of the light guiding plate 42, and a prism sheet 44 to be an optical sheet provided on the upside of the light diffusing sheet 43.

In the back light unit 40, the ray incident on the light guiding plate 42 from the lamp 41 is emitted as a ray having a distribution having a peak in a direction forming a specific angle obliquely upward and rightward from the upper surface of the light guiding plate 42, and is then incident on the light diffusing sheet 43. Then, the ray incident on the light diffusing sheet 43 is emitted as a ray having a distribution taking a peak in a direction closer to an upper part from the upper surface through the diffusion during the transmission in the light diffusing sheet 43 and is incident on the prism sheet 44.

Thereafter, the ray incident on the prism sheet 44 is emitted as a ray having a distribution taking a peak in a direction closer to an uppermost part from the upper surface of the prism sheet 44 through a prism portion 44a. Consequently, the ray emitted from the upper surface of the prism sheet is collected into the screen of the liquid crystal display provided in a just upper portion which is not shown so that the screen is illuminated.

In the conventional back light unit, moreover, two prism sheets 44 are superposed and incorporated such that the prism portions 44a are orthogonal to each other and light can be collected into the front face of the screen in the liquid crystal display in some cases.

In the prism sheet 44, furthermore, the corner portion of the prism portion 44a is easily damaged physically by other members. In some cases, therefore, a light diffusing sheet is further provided on the prism sheet to prevent the damage.

In the case in which the light diffusing sheet is used in the conventional back light unit, the ray transmitted from the light diffusing sheet can be emitted as a ray which approach as a just upward direction to be the direction of the front face of the screen in the liquid crystal display if the diffusion of the light diffusing sheet is more increased.

However, when the diffusion of the light diffusion sheet is increased too much, a quantity of light guided to a liquid crystal screen is decreased even if the direction of the peak of the ray can approach the just upward direction to be intended. Consequently, the efficiency of the light source is reduced.

In the case in which the prism sheet is used, the ray cannot be always incident on the prism sheet in a proper direction. For this reason, it is impossible to emit a ray taking a peak of a distribution in almost the just upward direction to be the direction of the front face of the liquid crystal screen. Thus, the liquid crystal screen cannot be illuminated efficiently.

In recent years, moreover, it has been desirable that the size of a product to be the application of the liquid crystal display should be reduced and the size of the back light unit should be reduced.

It is an object of the present invention to provide an optical sheet which can guide a ray to more approach a just upward direction to be a direction of a front face of a screen of a liquid crystal display without reducing an efficiency for a light source and which is not contrary to the request of a reduction in a size.

SUMMARY OF INVENTION

In order to solve the above-mentioned problem, the present invention provides an optical sheet in which a ray having a distribution taking peak in an obliquely upward direction forming a specific angle with respect to a lower surface thereof is incident from one of sides in a transverse direction, a base portion on a lower side including the lower surface and a fitting portion on an upper side including an upper surface are formed to be fitted each other in a vertical direction with less margin, and the base portion and the fitting portion are formed of materials having different refractive indices, the base portion is provided with a large number of triangular portions having a triangular sectional shape in parallel, the triangular portion having a first side surface positioned on one of the sides and a second side surface positioned on the other side, the first side surface has an angle formed in the transverse direction which is equal to or greater than an angle formed between a direction taking a peak of a ray refracted from the lower surface of the base portion and incident on an inside of the base portion and the transverse direction, and a direction taking a peak of a ray refracted and incident on the fitting portion through the second side surface of the base portion more approaches a just upward direction than a direction taking a peak of a ray transmitted to the second side surface through the inside of the base portion.

According to the optical sheet of the present invention, the ray having a distribution taking a peak in the direction forming the specific angle which is incident through the lower surface can be emitted, from the upper surface, as a ray taking a peak in a direction closer to the just upward direction. Consequently, the ray emitted from a light source can be guided efficiently in the direction of a front face of a liquid crystal screen.

The optical sheet can be formed such that the refractive index of a material forming the fitting portion is set to be smaller than that of a material forming the base portion and the gradient of the second side surface has a greater angle formed in the transverse direction than a gradient perpendicular to a direction taking a peak of a ray transmitted to the second side surface through the inside of the base portion.

In the case in which the refractive index of the fitting portion is set to be smaller than that of the based portion, the second side surface can be formed such that the gradient thereof is almost perpendicular to the transverse direction.

In the optical sheet in which the gradient of the second side surface is almost perpendicular to the transverse direction, the refractive index of the base portion and that of the fitting portion can be mutually adjusted such that the ray having a distribution taking a peak in the specific direction to be a direction forming a specific angle of incidence and incident through the lower surface of the optical sheet can be emitted as a ray having a distribution taking a peak in a direction forming a specific output angle.

In the optical sheet according to the present invention, the ray taking the peak in the direction forming the specific angle of incidence can be converted into a direction of travel of the ray taking a peak in the direction forming the specific output angle. By a combination with a prism sheet in which a ray taking a peak in the direction forming the specific output angle is an optimum direction for incidence, a ray taking a peak in almost the just upward direction can be emitted through the prism sheet so that the ray can be efficiently guided to the liquid crystal screen.

Moreover, in the optical sheet in which the refractive index of the fitting portion is smaller than that of the base portion and the gradient of the second side surface is almost perpendicular to the transverse direction, a difference between the refractive index of the base portion and that of the fitting portion can be set to be 0.15 or more. In the optical sheet having such a structure, the ray having a distribution taking a peak in the specific direction and incident from the lower surface of the optical sheet can be guided upward with respect to the optical sheet as a ray taking a peak in a direction closer to the just upward direction. By using two or more optical sheets without using the prism sheet, accordingly, the ray taking a peak in a direction closer to the just upward direction to be the direction of the front face of the liquid crystal screen can be emitted upward with respect to the two or more superposed optical sheets.

Consequently, it is not necessary to use the prism to guide the ray in the direction of the front face of the liquid crystal display. Therefore, a member constituting a back light unit can be decreased so that the size of the back light unit can be reduced.

In the case in which the difference between the refractive index of the base portion and that of the fitting portion in the optical sheet is set to be 0.15 or more, the refractive index of the base portion can be set to be 1.57 or more. Consequently, the ray incident on the two or more combined optical sheets from below can be emitted as a ray having a distribution taking a peak in almost the just upward direction upward with respect to the two or more combined optical sheets. Thus, the ray can be guided to the liquid crystal screen more efficiently.

Furthermore, in the optical sheet in which the refractive index of the fitting portion is smaller than that of the base portion and the gradient of the second side surface is almost perpendicular to the transverse direction, a difference between the refractive index of the base portion and that of the fitting portion can be set to be 0.3 or more. In the optical sheet having such a structure, the ray having a distribution taking a peak in the specific direction and incident from the lower surface of the optical sheet can be guided upward with respect to the optical sheet as a ray taking a peak in a direction closer to the just upward direction. By using only one optical sheet without using the prism sheet, accordingly, the ray taking a peak in a direction closer to the just upward direction to be the direction of the front face of the liquid crystal screen can be emitted upward with respect to the optical sheet.

Consequently, it is not necessary to use the prism sheet to guide the ray in the direction of the front face of the liquid crystal display. Furthermore, one optical sheet according to the present invention is enough. Therefore, a member constituting a back light unit can be decreased so that the size of the back light unit can be reduced.

In the case in which the difference between the refractive index of the base portion and that of the fitting portion in the optical sheet is set to be 0.3 or more, the refractive index of the base portion can be set to be 1.6 or more. Consequently, the ray incident on the optical sheet from below can be emitted as a ray having a distribution taking a peak in almost the just upward direction upward with respect to the optical sheet. Thus, the ray can be guided to the liquid crystal screen more efficiently.

Moreover, the base portion of the optical sheet in which the refractive index of the fitting portion is set to be smaller than that of the base portion and the gradient of the second side surface is almost perpendicular to the transverse direction can be formed of a thermoformable plastic material. Thus, the base portion to the foundation of the optical sheet can be formed by thermoformation. Consequently, the manufacture can be carried out easily. A polycarbonate based resin can also be used as the thermoformable plastic material for the formation of the base portion. With the polycarbonate based resin, a film having a high transparency can be obtained.

Furthermore, the fitting portion can be formed of an acryl based resin. An acryl based resin of a radiation polymerization type can be used for the acryl based resin. Consequently, the fitting portion can be formed through radiation easily.

It is possible to use an acryl based resin of the radiation polymerization type containing a fluorine group. By using the acryl based resin containing the fluorine group, the refractive index of the fitting portion can be reduced easily.

Moreover, the optical sheet can also be provided with a light diffusing layer on the upper surface of the fitting portion.

BRIEF DESCRIPTION OF DRAWINGS

FIG. 11($b$) is a partial sectional view showing the optical sheet.

BEST MODE FOR CARRYING OUT THE INVENTION

An embodiment of the present invention will be described below with reference to FIGS. 1 to 11.

Figure 1:
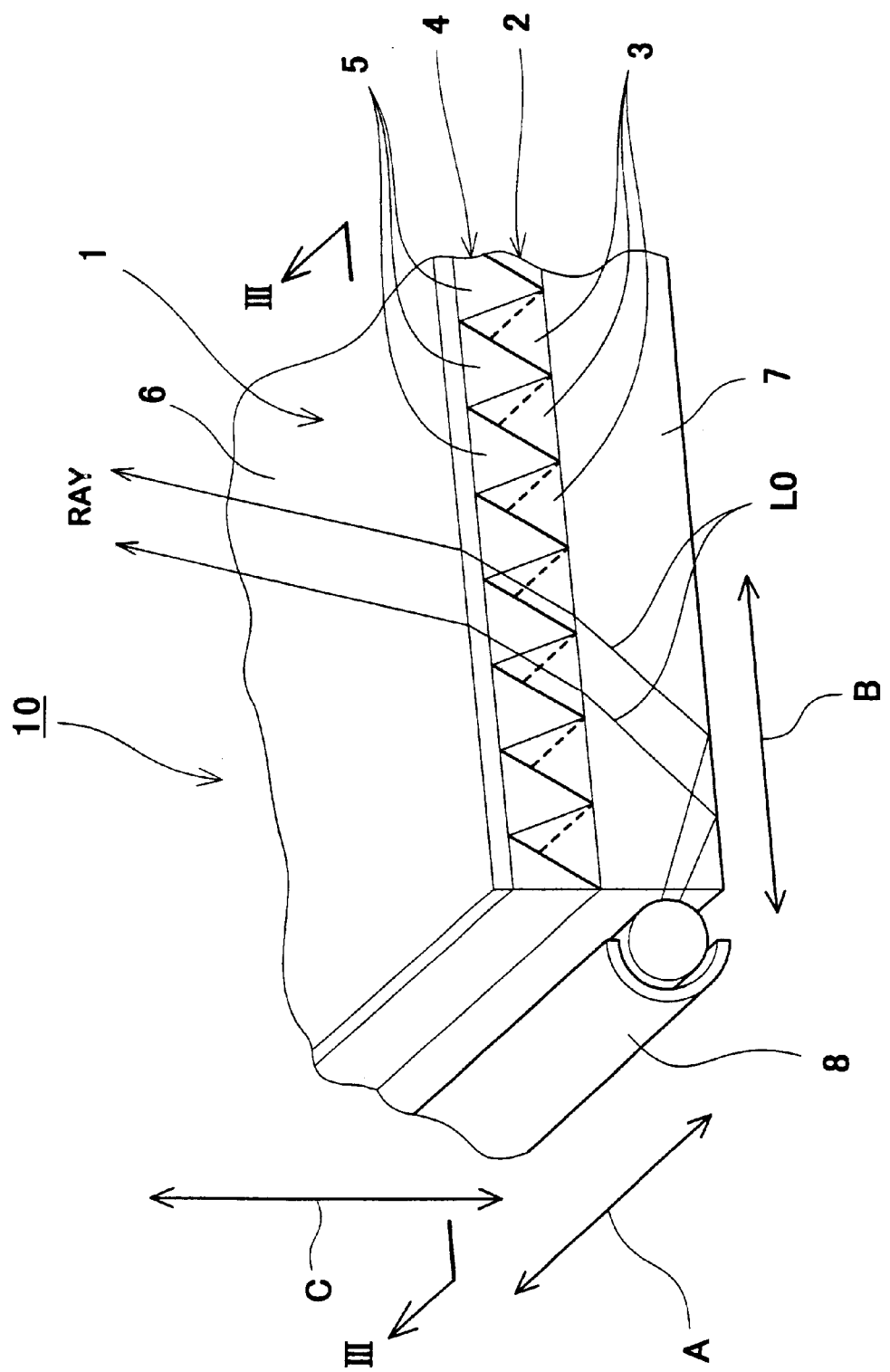
FIG. 1 is a perspective view showing a back light unit according to the present invention.

FIG. 1 is a perspective view showing a back light unit 10 using an optical sheet 1 according to an embodiment of an optical sheet of the present invention. In FIG. 1, a lamp 8, a light guiding plate 7 and the optical sheet 1 are provided. In FIG. 1, an arrow A indicates a longitudinal direction, an arrow B indicates a transverse direction and an arrow C indicates a vertical direction. Also in other drawings, these directions will be described in the same manner.

The back light unit 10 is provided with the lamp 8, the light guiding plate 7 and the optical sheet 1. A ray emitted from the lamp 8 is guided to the optical sheet 1 through the light guiding plate 7, and is further guided to a screen of a liquid crystal display provided on the optical sheet 1 which is not shown. The lamp 8 is a light source in the back light unit 10 and is provided in the longitudinal direction. The light guiding plate 7 is provided such that the lamp 8 is positioned on the outside of a left end thereof. The light guiding plate 7 is a member for guiding the ray of the lamp 8 incident from the left side to the optical sheet 1 which will be described below, and is provided with a reflection dot which is not shown or a reflection sheet on the outside of a lower surface thereof. The ray incident on the light guiding plate 7 is reflected obliquely upward and rightward through the reflection dot or the like and is emitted to the optical sheet 1 from the upper surface of the light guiding plate 7.

Figure 2:
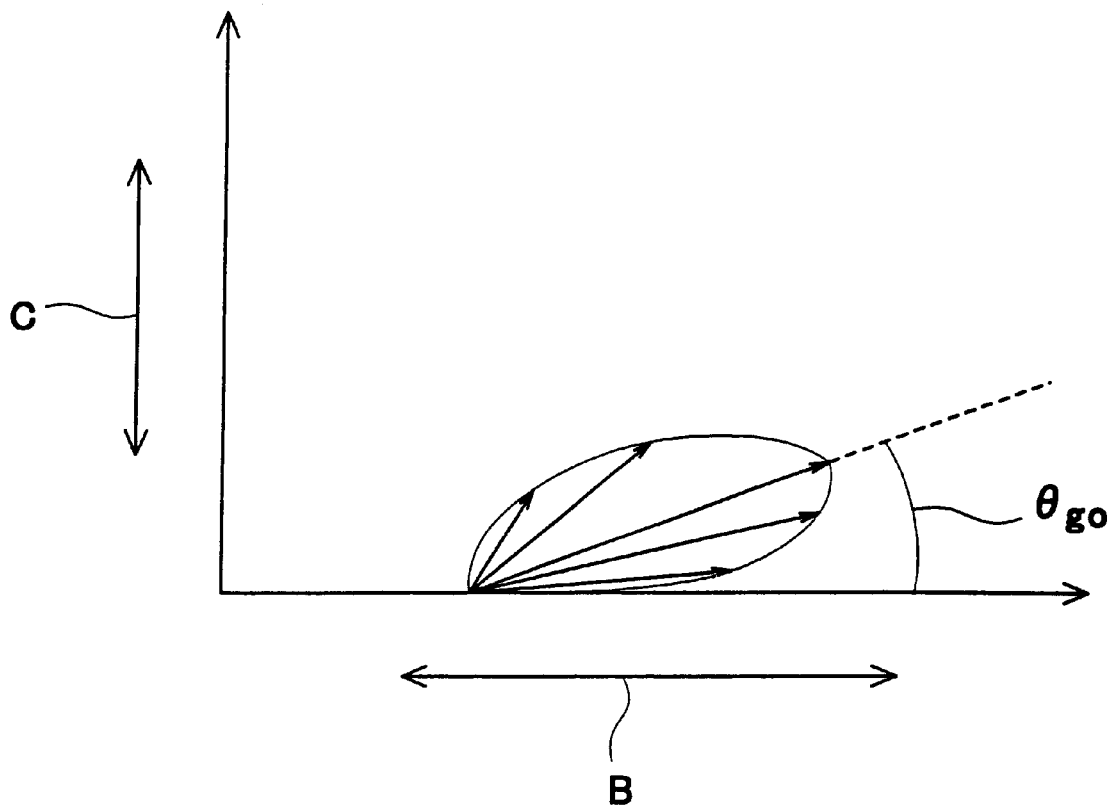
FIG. 2 is a chart showing a ray incident on an optical sheet.

Moreover, the light guiding plate 7 is formed of polymethyl methacrylate (PMMA) which is typical of the material of the light guiding plate. The ray emitted from the upper surface of the light guiding plate 7 will be described below with reference to FIG. 2. In FIG. 2, an axis of abscissa indicates a right direction in the transverse direction B to be a positive direction and an axis of ordinate indicates an upward direction in the vertical direction C to be a positive direction. The ray emitted from the upper surface of the light guiding plate 7 takes a distribution having a peak in a direction forming a specific angle of $\theta_{g0}$ obliquely upward and rightward with respect to the transverse direction as shown in FIG. 2. The specific direction forming the angle of $\theta_{g0}$ corresponds to a direction forming a specific angle of incidence of the ray incident from the lower surface of the optical sheet 1 which will be described below.

Figure 3:
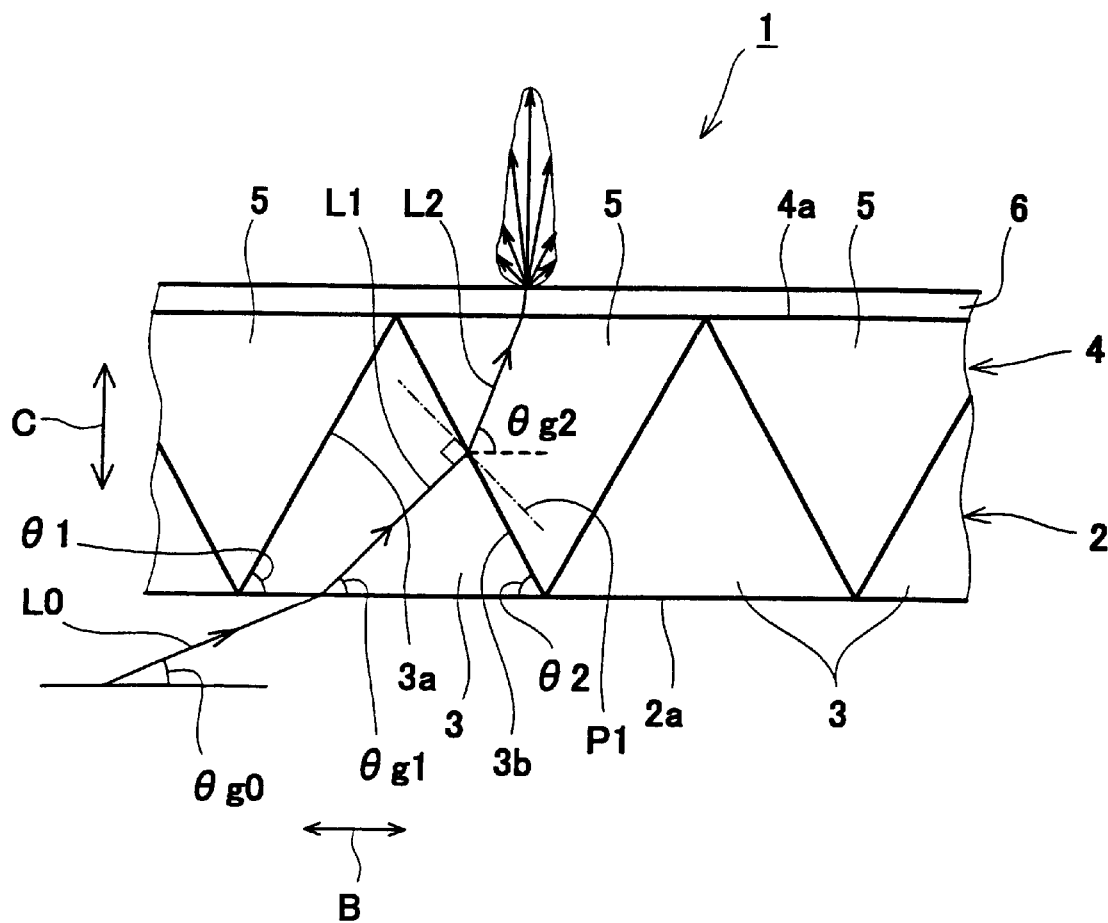
FIG. 3 is a partial sectional view showing an optical sheet according to the present invention.

Next, the optical sheet 1 will be described with reference to FIG. 3. FIG. 3 is a partial sectional view showing the optical sheet 1 which is included in a section taken along the line III—III in FIG. 1. The optical sheet 1 is a member provided on the upper side of the light guiding plate 7 for guiding the ray emitted from the light guiding plate 7 to the screen of the liquid crystal display provided in a further upper part which is not shown. The optical sheet 1 is provided with a base portion 2, a fitted portion 4 and a light diffusing layer 6.

The light diffusing layer 6 is a well-known light diffusing layer and can be formed of a layer coated with a coating solution or an embossed shape.

The base portion 2 has a bottom surface 2a forming the lower surface of the optical sheet 1 to have an almost planar shape, and a large number of triangular portions 3 having triangular sectional shapes are provided in parallel. The triangular portion 3 has a first side surface 3a positioned on the left side to be one of sides in the transverse direction where the lamp 8 is present and a second side surface 3b positioned on the right side to be the other side in the transverse direction.

The first side surface 3a takes an angle θ1 with respect to the transverse direction in the following manner. More specifically, the angle of θ1 of the first side surface 3a is given to be equal to or greater than an angle of $\theta_{g1}$ formed between a direction indicating the peak of a ray L1 incident on the base portion 2 through the lower surface 2a of the base portion 2 formed of a material having a refractive index n1 and the transverse direction. Consequently, all the ray transmitted in the direction indicating the peak of the ray L1 incident on the inside of the base portion 2 through the lower surface 2a of the optical sheet 1 can be guided to the second side surface 3b.

The second side surface 3b is formed such that a gradient thereof has a greater angle of θ2 formed in the transverse direction than that of a gradient P1 which is vertical to the direction indicating the peak of the ray L1.

The fitting portion 4 is formed to be fitted with little clearance on the upper side of the lower base portion 2. Accordingly, the fitting portion 4 is constituted by a large number of inverted triangular portions 5 provided along the triangular portions 3 to be fitted in the respective triangular portions 3 of the base portion 2 as shown in FIG. 3. Moreover, the fitting portion 4 is formed with an upper surface 4a thereof having an almost planar shape.

Furthermore, the fitting portion 4 is formed of a resin having a refractive index n2 which is smaller than the refractive index n1 of the base portion 2. The light diffusing layer 6 is provided on the upper surface 4a of the fitting portion 4 and the ray incident on the light diffusing layer 6 through the fitting portion 4 is diffused with a passage through the light diffusing layer 6.

According to the optical sheet, the ray incident on the lower surface 2a is emitted as a ray having a peak in a direction closer to the just upward direction from the upper surface of the optical sheet 1. More specifically, as shown in FIG. 3, a ray L0 emitted from the light guiding plate 7 indicates a peak of a ray in a direction forming an angle $\theta_{g0}$ obliquely upward and rightward with respect to the transverse direction. While the ray L0 is refracted and incident on the inside of the base portion 2 through the lower surface of the optical sheet 1, the ray L1 incident on the inside of the base portion 2 becomes a ray in a direction taking a peak which forms an angle of $\theta_{g1}$ of in the obliquely upward and rightward direction and more approaches the just upward direction than the ray L0 ($\theta_{g0} < \theta_{g1}$).

The ray L1 is transmitted to the second side surface 3b in the base portion 2 and is incident on the fitting portion 4 through the second side surface 3b. Then, the ray L1 is changed into a ray L2 which is refracted during the incidence on the fitting portion 4 and has a direction taking a peak forming an angle of $\theta_{g2}$ in the obliquely upward and rightward direction and more approaches the just upward direction than the direction ($\theta_{g1}$) of the peak of the ray L1 ($\theta_{g1} < \theta_{g2}$). The first side surface 3a is formed to have an angle equal to or greater than the angle $\theta_{g1}$. Therefore, a portion of the ray L1 incident through the lower surface 2a of the base portion 2 which travels in the direction of the peak can be effectively guided to the second side surface 3b.

Then, the ray L2 is transmitted to the upper surface 4a in the fitting portion 4 and can be emitted in an upward direction from the upper surface 4a of the fitting portion 4. According to the optical sheet 1, therefore, the ray emitted from the light guiding plate 7 can be guided to the light diffusing layer 6 very efficiently.

Then, the ray L2 is transmitted to the upper surface 4a in the fitting portion 4 and is incident on the light diffusing layer 6, and is diffused by the light diffusing layer 6 so that the direction of the peak of the ray emitted upward can more approach the just upward direction. Moreover, the ray emitted upward from the optical sheet 1 can be distributed with a more uniform intensity through the diffusion of the light diffusing layer 6.

According to the optical sheet 1, thus, the ray incident from below can be emitted upward as a ray indicating a peak in a direction closer to the just upward direction. Therefore, it is not always necessary to use a back light unit by combining a large number of other sheets such as a prism sheet. Consequently, the size of the back light unit can be reduced. Moreover, the optical sheet 1 is constituted by a combination of the base portion and the fitting portion and a corner portion is not exposed to the outside differently from a conventional prism sheet. Thus, there is an advantage that the optical sheet 1 can be prevented from being damaged and can be handled easily at a step of assembling the back light unit.

Next, the manufacture of the optical sheet 1 will be described. The optical sheet 1 can be formed at the following steps. First of all, a metal mold is prepared for forming the base portion 2. More specifically, the triangular portion 3 constituting the base portion 2 of the optical sheet 1 is inverted. A large number of triangular portions 3 are cut in parallel. Thus, the metal mold is prepared.

The base portion 2 can be formed by an injection molding method for injecting a molten resin into the metal mold or a method of reheating a sheet resin and pressing the resin between the same metal mold as described above and a metal plate, thereby transferring a shape.

Moreover, the base portion 2 can be formed by an extrusion sheet molding method for cutting, into a roll, the same inverted shape as described above and nipping a first sheet-shaped molten resin in the roll and another roll, thereby transferring a shape, a method for pressing a UV curing resin against a roll having the same shape as described above, transferring the uncured UV curing resin into the shape of the roll and exposing ultraviolet rays thereto, thereby carrying out curing, a method using an EB curing resin in place of the UV curing resin, and the like. It is preferable that a transparent resin such as an acryl based resin, a polycarbonate based resin, a styrene based resin or polyester based resin should be used.

Next, since the fitting portion 4 can be formed by inverting the formed base portion 2, it can be formed by using the metal mold and the roll. It is preferable that a resin having a smaller refractive index than that of the resin used for forming the base portion 2 should be utilized as a resin to be used for forming the fitting portion 4.

The base portion 2 thus obtained and the fitting portion 4 are fitted each other in a vertical direction and are bonded to each other with an adhesive. More specifically, the adhesive is applied to the outside of a first side surface 3a of the base portion 2 and the outside of a second side surface 3b, and the fitting portion 4 is fitted from above to press an upper surface. 4a of the fitting portion 4. Consequently, the base portion 2 and the fitting portion 4 can be bonded to each other. Examples of the adhesive include an acryl based adhesive which is excellent in transparency.

As other methods, after the base portion 2 is manufactured, a resin (a UV curing resin, an EB curing resin, a thermosetting resin or the like) for forming the fitting portion 4 is applied and cured in concavo-convex parts of the base portion 2 and a surface is smoothened. Thus, the fitting portion 4 can be manufacturey.

Subsequently, the light diffusing layer 6 is formed on the fitting portion 4. The light diffusing layer 6 can be formed by applying a coating solution having a mixture of beads such as an acryl based resin and a raw material of a binder on the upper surface of the fitting portion 4 through a roll coater or the like, for example. Moreover, the light diffusing layer may have an embossed shape.

While the relationship between the refractive index n1 of the base portion 2 and the refractive index n2 of the fitting portion 4 is set to be n1>n2 in the above description, n1<n2 may be set. The relationship among the second side surface 3b of the base portion 2, the ray L1 incident on the second side surface 3b and the ray L2 transmitted through the fitting portion 4 with n1<n2 is shown in FIG. 4.

Figure 4:
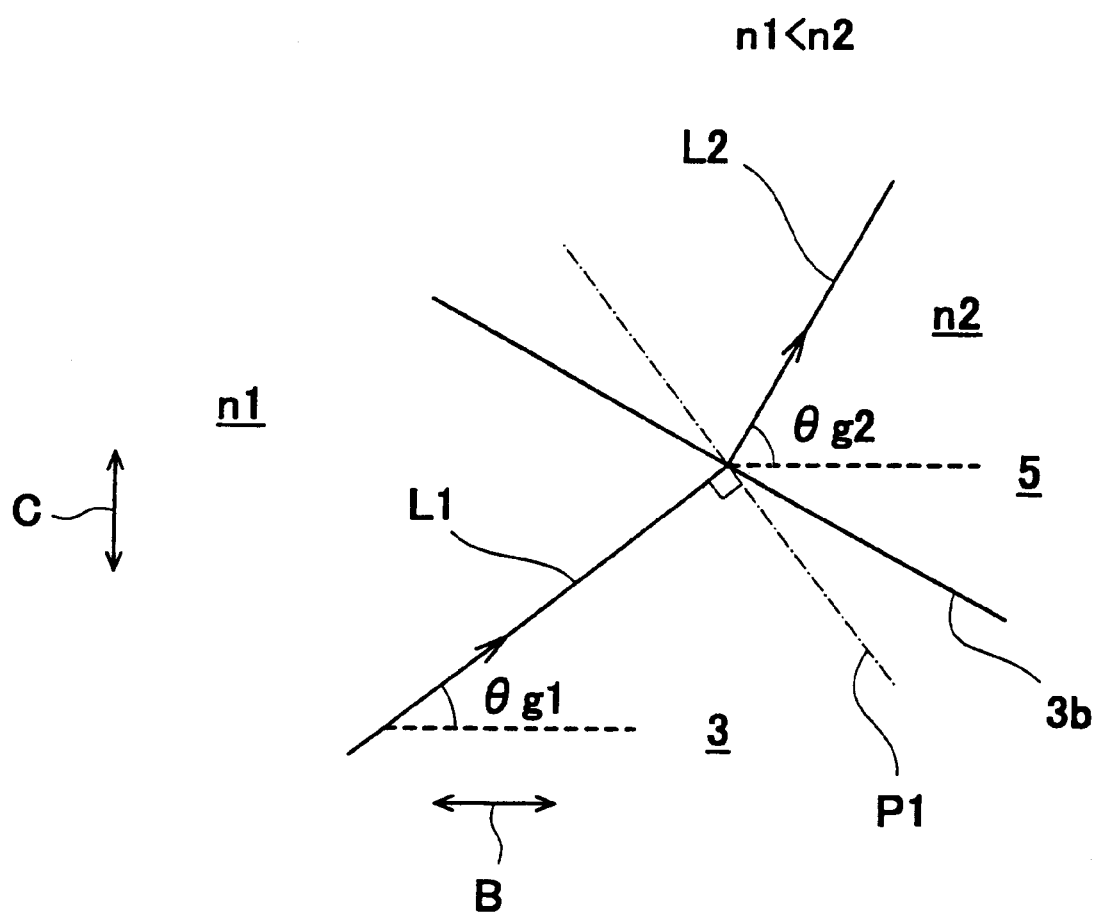
FIG. 4 is a diagram showing another configuration of a second side surface.

In the case of n1<n2, as shown in FIG. 4, the gradient of the second side surface 3b may be set such that an angle formed in a transverse direction is smaller than that of a gradient P1 perpendicular to a direction ($\theta_{g1}$) of the peak of the ray L1 (that is, more distant in the vertical direction). As compared with the ray L1, consequently, the ray L2 incident on the fitting portion 4 can be refracted such that a direction ($\theta_{g2}$) of the peak more approaches the just upward direction.

Figure 5:
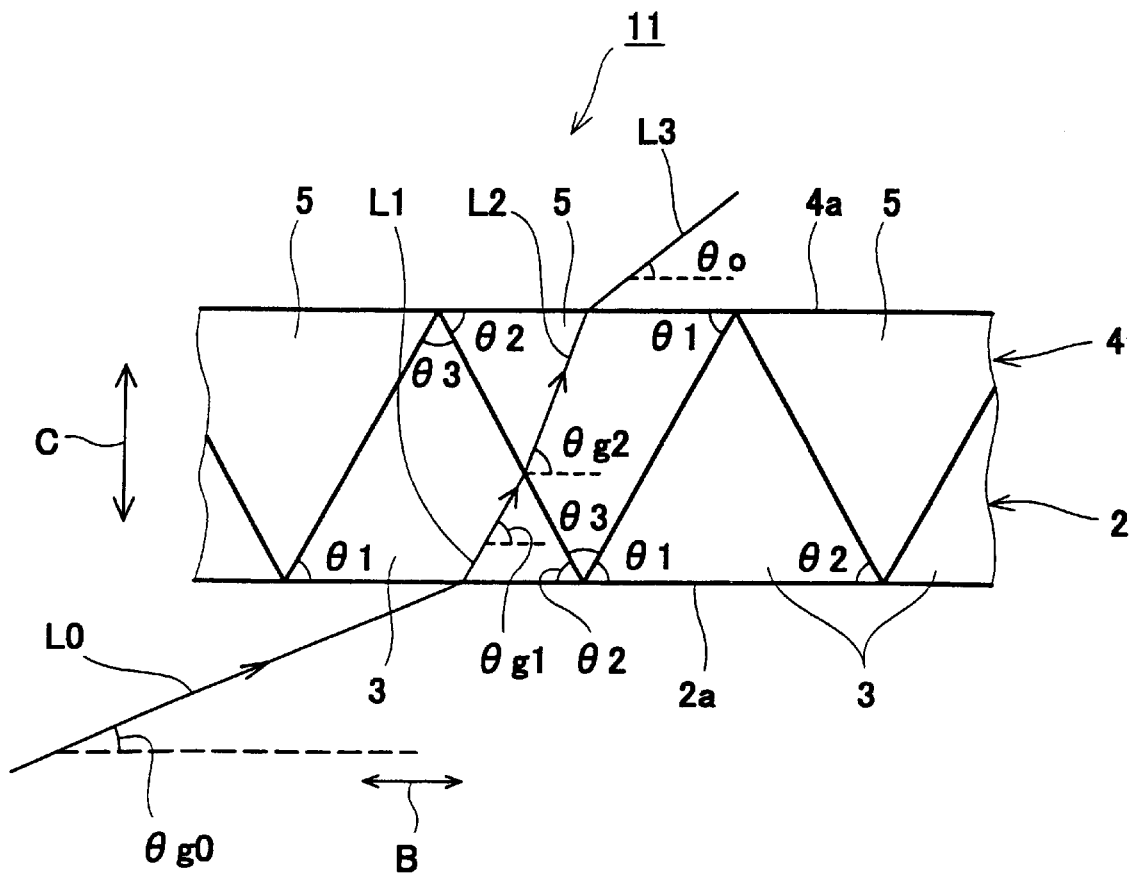
FIG. 5 is a partial sectional view showing another optical sheet according to the present invention.

While the example in which the base portion 2, the fitting portion 4 and the light diffusing layer 6 are provided has been described above as an example of the optical sheet, the optical sheet may have a structure shown in FIG. 5. FIG. 5 is a diagram showing the optical sheet 11 constituted by the base portion 2 and the fitting portion 4. Referring to the optical sheet 11, similarly, when the ray L0 having a distribution taking a peak in a specific direction ($\theta_{g0}$) from the lower surface 2a is incident, the ray L3 closer to the just upward direction can be emitted from the upper surface 4a of the fitting portion 4.

Figure 6:
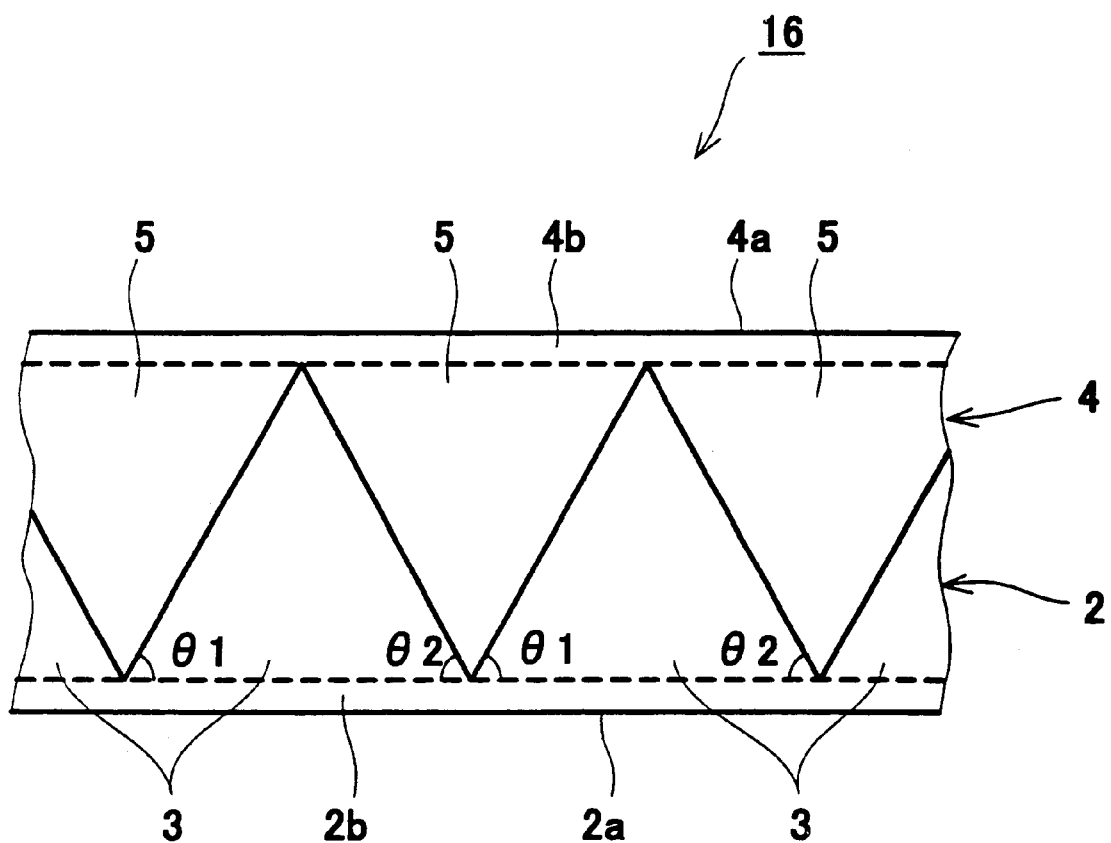
FIG. 6 is a partial sectional view showing yet another optical sheet according to the present invention.

As in an optical sheet 16 shown in FIG. 6, moreover, a lower substrate portion 2b may be provided under the triangular portion 3 to form the base portion 2 and an upper substrate portion 4b may be provided on the inverted triangular portion 5 to form the fitting portion 4. In this case, the lower surface of the lower substrate portion 2b acts as the lower surface 2a of the base portion 2 and the upper surface of the upper substrate portion 4b acts as the upper surface 4a of the fitting portion 4.

Referring to the above-mentioned optical sheet, furthermore, a specific example in which the refractive index n1 of the base portion 2 is greater than the refractive index n2 of the fitting portion 4 will be described by taking the optical sheet 11 as an example.

In the optical sheet 11, the base portion 2 is formed of a polyester based resin. The base portion 2 has a refractive index of n1=1.63. Referring to each triangular portion 3 constituting the base portion 2, moreover, an angle formed between the first side surface 3a and the transverse direction is set to $\theta 1=58°$ and an angle formed between the second side surface 3b and the transverse direction is set to $\theta 2=70°$. Furthermore, an angle formed between the first side surface 3a and the second side surface 3b is set to $\theta 3=52°$. The fitting portion 4 is formed of an acryl based resin. The fitting portion 4 has a refractive index of n2=1.49.

The ray L0 taking a peak in an obliquely upward and rightward direction of $\theta_{g0}=20°$ with respect to the transverse direction is incident on the optical sheet 11 through the lower surface 2a. Consequently, an obliquely rightward and upward direction forming an angle of $\theta_{g1}=54.8°$ takes the peak of the ray L1 transmitted into the base portion 2. An obliquely rightward and upward direction forming an angle of $\theta_{g2}=58.6°$ takes the peak of the ray L2 transmitted into the fitting portion 4. An obliquely rightward and upward direction forming an angle of $\theta_0=34.9°$ takes the peak of the ray L3 transmitted into the upper surface 4a of the optical sheet 11.

According to the optical sheet 11 of the present invention, thus, the ray incident through the lower surface can be emitted closer to the just upward direction.

Figure 7A:
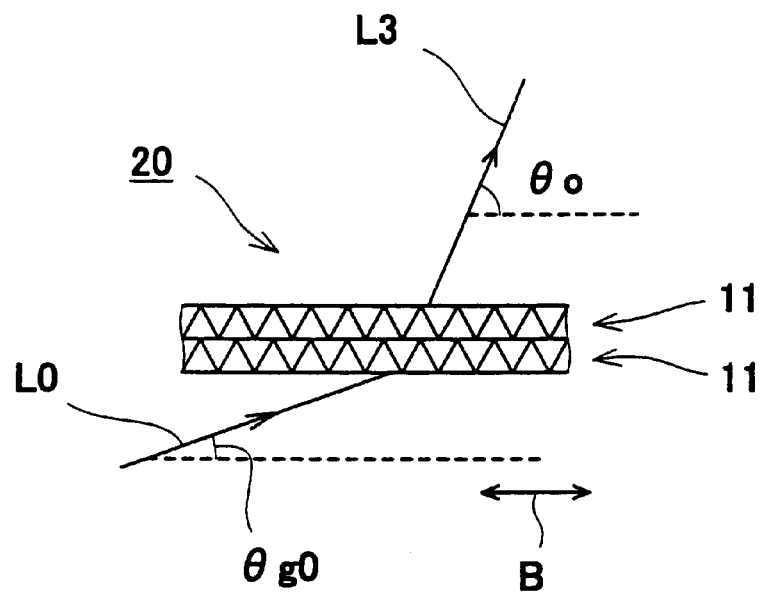
FIG. 7 is a partial sectional view showing an optical unit according to the present invention.

Moreover, the optical sheet can also be constituted in the following manner. As shown in FIG. 7(a), two optical sheets 11 are superposed vertically to form an optical unit 20. When the ray L0 taking the peak in the obliquely rightward and upward direction forming an angle of $\theta_{g0}=20°$ with respect to the transverse direction was incident on the lower surface of the optical sheet 11 on the lower side constituting the optical unit 20, the ray L3 taking the peak in the obliquely rightward and upward direction forming an angle of $\theta_0=53.6°$ was emitted from the upper surface of the optical sheet 11 on the upper side.

Figure 7B:
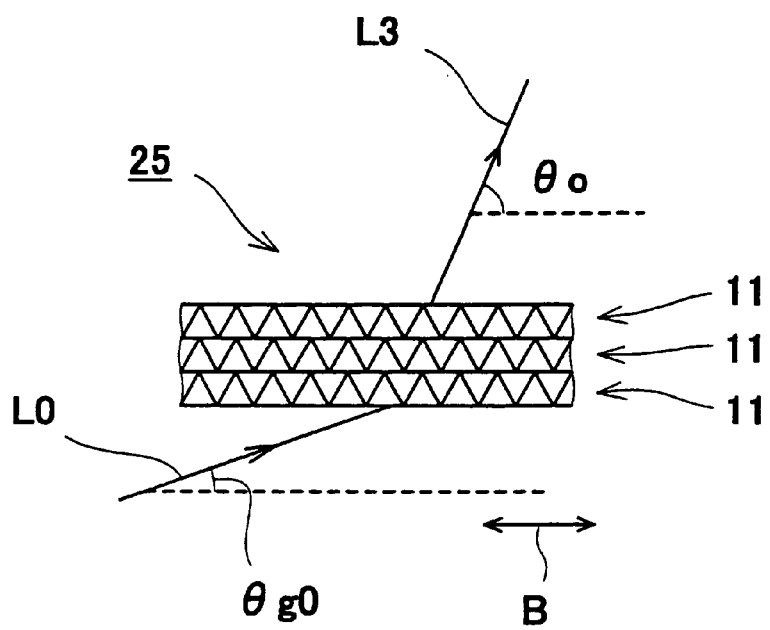

As shown in FIG. 7(b), moreover, three optical sheets 11 are superposed vertically to form an optical unit 25. When the ray L0 taking the peak in the obliquely rightward and upward direction forming an angle of $\theta_{g0}=20°$ was incident on the lower surface of the optical sheet 11 in the lowermost stage constituting the optical unit 25, the ray L3 taking the peak in the obliquely rightward and upward direction forming an angle of $\theta_0=67.6°$ was emitted from the upper surface of the optical sheet 11 in the uppermost stage.

According to the optical unit constituted by superposing a large number of optical sheets 11 in accordance with the present invention, it was confirmed based on the above-mentioned specific example that the ray incident from the lower side can be emitted to further approach the just upward direction.

Furthermore, another embodiment of the present invention will be described.

Figure 8:
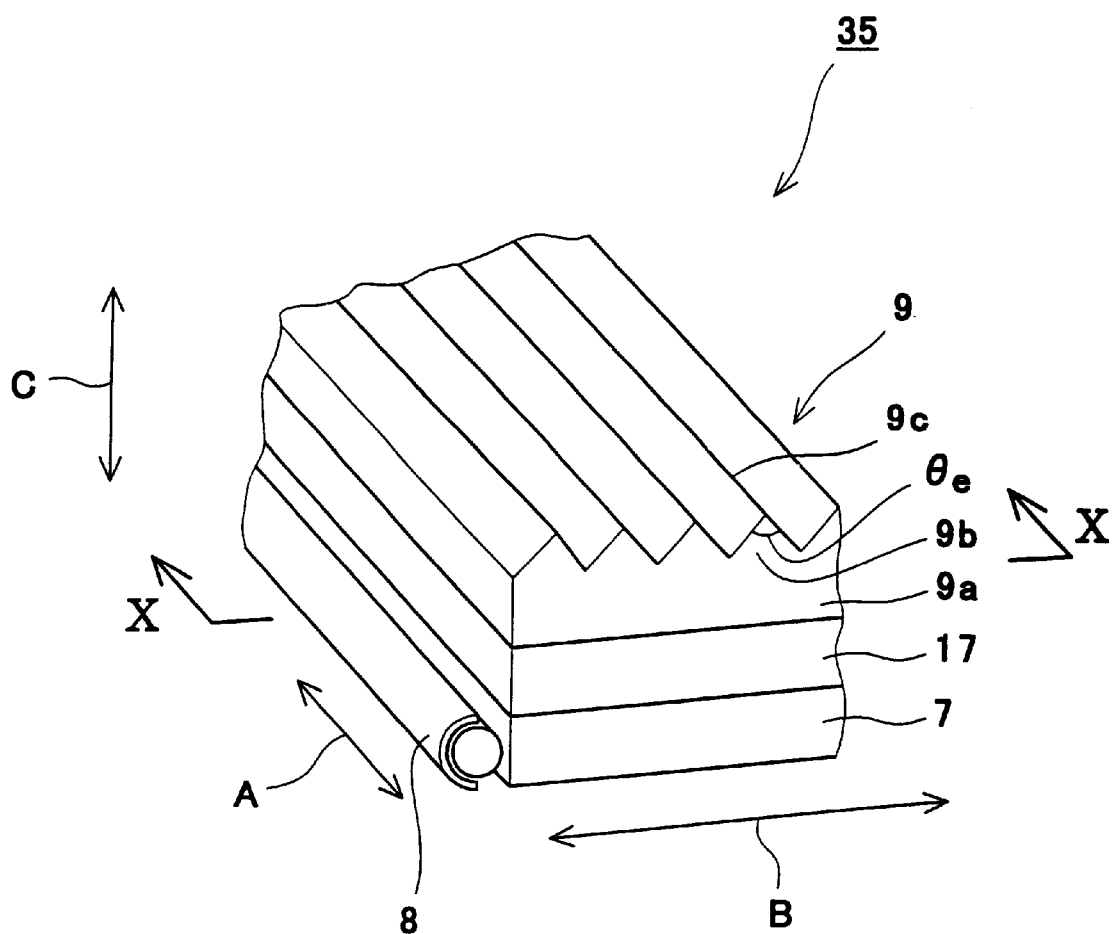
FIG. 8 is a perspective view showing another back light unit according to the present invention.

FIG. 8 is a perspective view showing a back light unit 35 incorporating an optical sheet 17 according to an example of the optical sheet in accordance with the present invention.

The back light unit 35 comprises a lamp 8, a light guiding plate 7, an optical sheet 17 and a prism sheet 9. The lamp 8 is a light source in the back light unit 35 and is provided in a longitudinal direction.

The light guiding plate 7 is provided such that the lamp 8 is positioned on the outside of a left end thereof. The light guiding plate 7 is a well-known light guiding plate provided for guiding the ray of the lamp 8 incident from the left side to the optical sheet 17, and a reflecting dot which is not shown is formed or a reflecting sheet is provided on the outside of a lower surface thereof. The ray incident on the light guiding plate 7 is reflected obliquely rightward and upward direction by the reflecting dot or the like and are emitted to the optical sheet 17 through the upper surface of the light guiding plate 7.

Then, the ray emitted from the upper surface of the upper surface of the light guiding plate 7 have a distribution taking a peak in a specific direction forming an angle of $\theta_{g0}$ with respect to the transverse direction B as shown in FIG. 2. The specific direction forming an angle of $\theta_{g0}$ corresponds to a direction of a specific angle of incidence of the ray incident through the lower surface of the optical sheet 17.

The prism sheet 9 is provided on the optical sheet 17. The ray incident on the upper surface of the optical sheet 17 is incident through the lower surface of the prism sheet 9, and the ray emitted from the upper surface of the prism sheet 9 is guided to a screen of a liquid crystal display provided in an upper portion which is not shown.

As shown in FIG. 8, moreover, the prism sheet 9 is a well-known prism sheet and is constituted by a base material portion 9a and an upper prism portion 9b. The prism portion 9b is formed with an apex angle $\theta e$ of 90° which is formed by the upper surface interposing a peak line 9c. In the back light unit 35, the prism sheet 9 is provided such that the peak line 9c of the prism portion 9b is formed in a longitudinal direction A.

The prism sheet 9 has a proper direction of incident a ray. In order for the prism sheet 9 to emit the ray having a distribution taking a peak in almost the just upward direction, the ray taking a peak of the distribution in a proper specific direction should be incident through the lower surface of the prism 9.

Figure 9A:
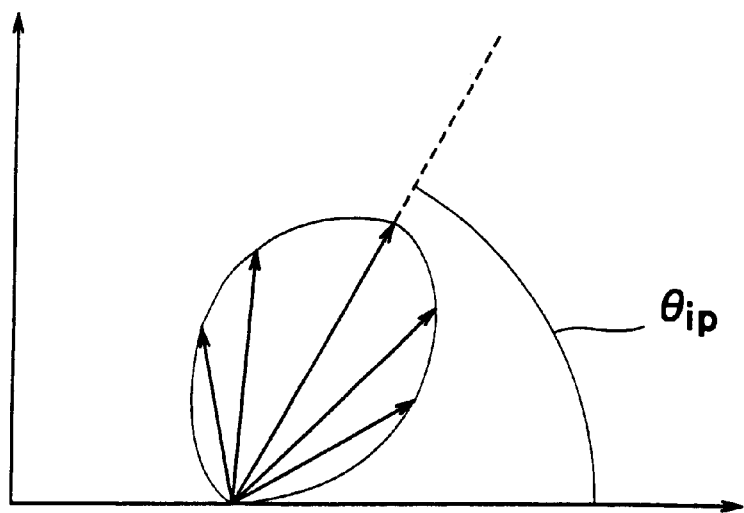
FIG. 9 is a chart showing the characteristic of incident light and emitted light of a prism sheet.
Figure 9B:
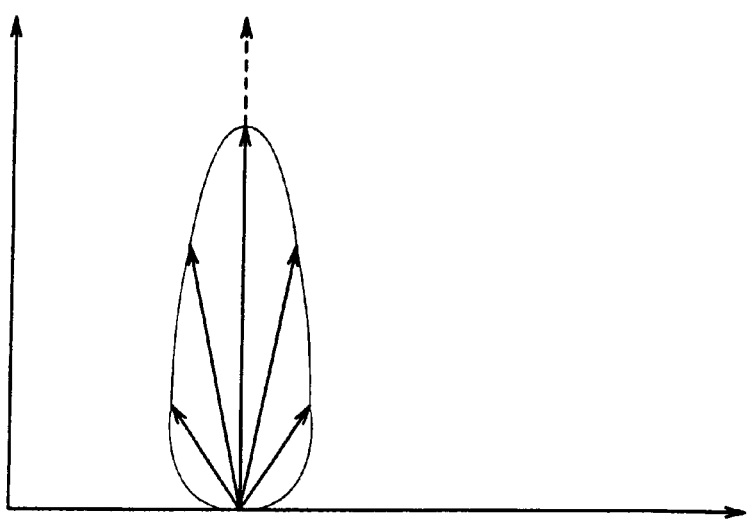

FIG. 9 shows the relationship between a distribution of the ray incident through the lower side of the prism sheet 9 and a distribution of the ray emitted from the prism sheet 9. In FIG. 9, an axis of abscissa indicates a rightward direction in a transverse direction B to be positive and an axis of ordinate indicates an upward direction in a vertical direction C to be positive. FIG. 9(a) shows the distribution of the ray incident on the lower surface of the prism sheet 9 and FIG. 9(b) shows the distribution of the ray emitted from the upper surface of the prism sheet 9. In the prism sheet 9, when the ray taking a peak in a specific direction forming an angle of $\theta_{ip}$ with respect to the transverse direction B shown in FIG. 9(a), the ray taking a peak in the just upward direction as shown in FIG. 9(b) can be emitted.

The optical sheet 17 is provided on the light guiding plate 7 and the ray emitted from the light guiding plate 7 is emitted to the prism sheet 9 described above. As described below, the optical sheet 17 can emit the ray taking the peak of the distribution in the direction forming an angle of $\theta_{ip}$ with respect to the prism sheet 9. More specifically, in the optical sheet 17 according to the invention, the direction forming an angle of $\theta_0$ which is the direction of the peak of the distribution of the ray emitted from the optical sheet 17 is set to be the direction forming a specific output angle which is coincident with the direction forming an angle of $\theta_{ip}$ optimum for the prism sheet 9.

Figure 10:
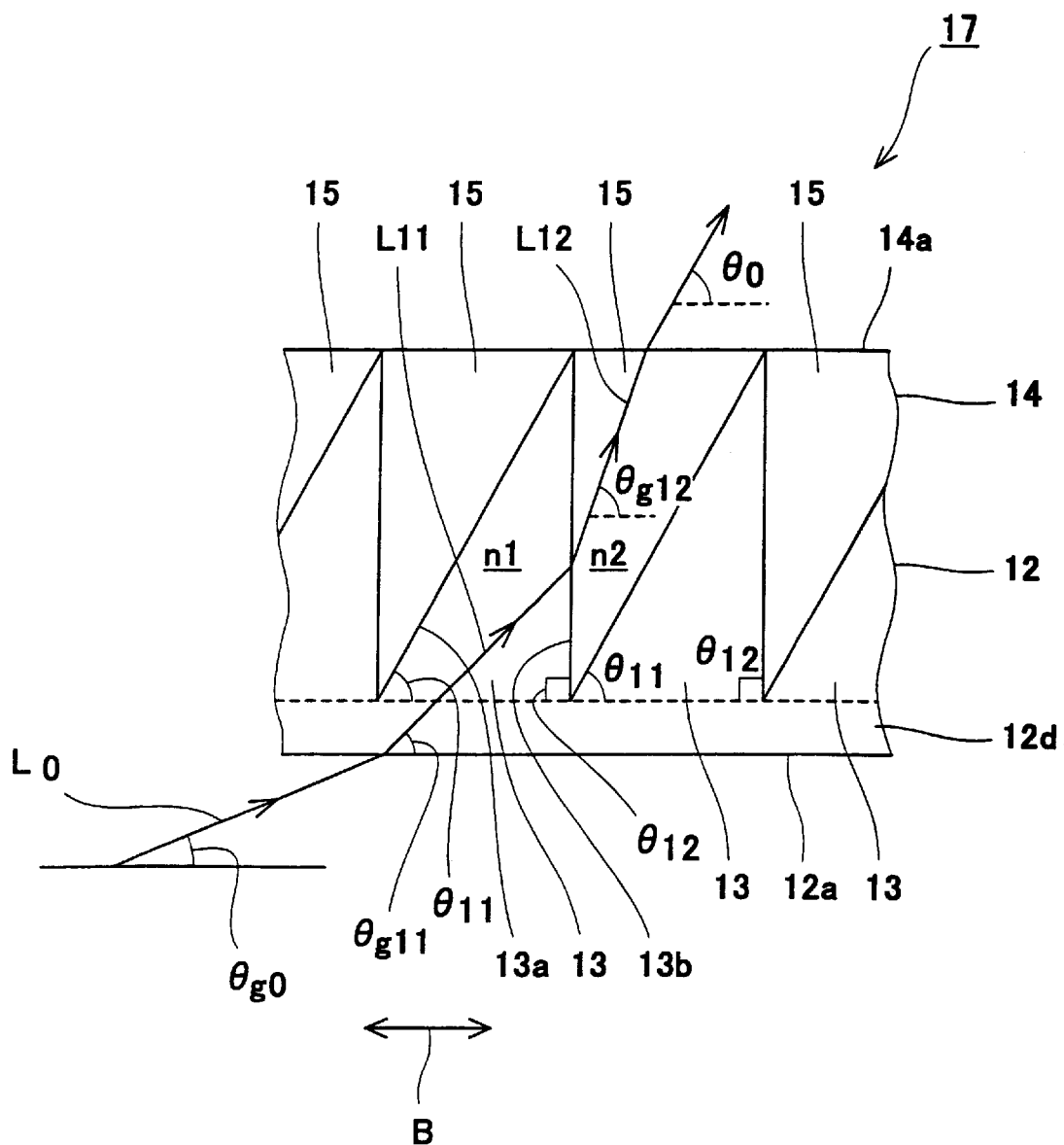
FIG. 10 is a partial sectional view showing a further optical sheet according to the present invention.

Such an optical sheet 17 will be described with reference to FIG. 10. FIG. 10 is a partial sectional view showing the optical sheet 17 which is included the section taken along the line X—X in FIG. 8.

The optical sheet 17 is constituted by a base portion 12a and a fitting portion 14. The base portion 12 has a bottom face 12 almost planar shaped. Moreover, the base portion 12 has such a structure that a large number of triangular portions 13 having a triangular sectional shape provided in parallel on a lower foundation portion 12d having a planar shape. The triangular portion 13 has a first side surface 13a positioned on the left side to be one of sides where the lamp 8 is present in the transverse direction and a second side surface 13b positioned on the right side to be the other side in the transverse direction.

An angle $\theta 11$ formed with respect to the transverse direction is given to the first side surface 13a in the following manner. In other words, the angle $\theta 11$ of the first side surface 13a is given to be equal to or greater than the angle $\theta_{g11}$ formed between a direction having the peak of the ray L11 incident on the base portion 12 through the lower surface 12a of the base portion 12 which is formed of a material having a refractive index n1 and the transverse direction. Moreover, the second side surface 13b is formed such that an angle $\theta 12$ formed with respect to the transverse direction is almost perpendicular.

The fitting portion 14 is formed to be fitted in the upper side of the base portion 12 on the lower side with less margin. Accordingly, the fitting portion 14 is constituted by a large number of inverted triangular portions 15 provided along the triangular portions 13 to be fitted in the triangular portion 13 of the base portion 12 as shown in FIG. 10. Moreover, the fitting portion 14 has an upper surface 14a almost planar-shaped.

Furthermore, the fitting portion 14 is formed in the following manner. The fitting portion 14 is formed of a material having a refractive index n2 which is smaller than the refractive index n1 of the base portion 12 and which can cause the direction forming an angle of $\theta_0$ of the ray emitted from the upper surface 14a of the fitting portion 14 to be coincident with a direction of $\theta_{ip}$ having the specific output angle which is a direction optimum for the prism sheet 9. In other words, a refractive index n2 is selected such that a ray L12 which is refracted by the second side surface 13b, is incident on the fitting portion 1 the fitting portion 14 and has a peak in a specific direction forming an angle of $\theta_{g12}$ in the transverse direction can be transmitted into the fitted portion 14 and can be emitted as a ray having a peak in the direction forming an angle of $\theta_{ip}$ through the upper surface 14a of the fitting portion 14.

The optical sheet 17 can be formed of the following material by the following manufacturing method. The base portion 12 can be formed of a resin, that is, a plastic material which can be thermoformed. It is possible to use an extrusion sheet molding method for preparing a first roll in which an inverted triangular portion 13 of the base portion 12 is cut, nipping the molten sheet-shaped plastic material capable of being thermoformed with the first roll and a second roll, thereby transferring a shape.

It is desirable that the thermoformable plastic material for forming the base portion 12 should be adjusted to reduce a double refraction to light. More specifically, when the double refraction is generated in the base portion 12, the ray cannot be propagated effectively to the fitting portion 14 so that an efficiency of propagation of the rays to the prism sheet 9 is reduced. Example of a method for adjusting a plastic material to reduce the double refraction can include a method for copolymerizing a resin having a different orientation of the double refraction.

In particular, it is desirable that polycarbonate (PC) should be used as the plastic material for forming the base portion 12. By using the polycarbonate, it is possible obtain a film which can be thermoformed easily and has a high transparency and a great refractive index.

In order to form the fitting portion 14, an acryl based resin can be used. In particular, it is preferable that an acryl based resin of a radiation polymerization type should be used. A liquefied acryl based resin of the radiation polymerization type is filled between the triangular portions 13 of the base portion 12 thus formed. Then, radiation is irradiated and cured so that the fitting portion 14 can be formed. Moreover, it is preferable that the acryl based resin of the radiation polymerization type, particularly, an acryl based resin containing a fluorine group should be used. Consequently, the fitting portion 14 having a low refractive index can be formed easily.

In order to form the optical sheet 17, it is possible to use, in addition to the above-mentioned methods, an injection molding method for injecting a molten resin into a metal mold having the shapes of the base portion 12 and the fitting portions 14 formed therein, a method for reheating a sheet resin and pressing the resin between the same metal mold as described above and a metal plate, thereby transferring a shape, and the like.

Moreover, it is also possible to use a method for pressing a uncured UV curing resin against the first roll to be used for the extrusion sheet molding method, thereby transferring a shape and carrying out curing through ultraviolet rays. Furthermore, the optical sheet 17 may be formed by using an EB curing resin in place of the UV curing resin.

Description will be given to an example of the specific structures of the optical sheet 17 and the back light unit 35 incorporating the optical sheet 17. A wedge-shaped light guiding plate having a great directivity is used as the light guiding plate 7. The light guiding plate 7 emits ray having a distribution taking peak in a direction forming an angle of $\theta_{g0}=15°$ with respect to the transverse direction B from an upper surface thereof.

BEF II manufactured by 3M Co., Ltd. is used for the prism sheet 9. When a ray taking a peak in a direction forming an angle of $\theta_{ip}=61°$ with respect to the transverse direction B (29° with respect to a vertical direction) is incident through a lower surface thereof, a ray taking peak in almost the just upward direction is emitted from the upper surface of the prism sheet 9.

Referring to the optical sheet 17, the base portion 12 is constituted by polycarbonate (PC) and has a refractive index of n1=1.586. Referring to the triangular portion 13 of the base portion 12, moreover, an angle of $\theta 11=52.5°$ is formed in the transverse direction of the first side surface 13a and an angle of $\theta 12=90°$ is formed in the transverse direction of the second side surface 13b. The fitting portion 14 is formed of an acryl based resin containing fluorine and the fitting portion 14 has a refractive index of n2=1.35.

With such a structure of the optical sheet 17, the ray taking a peak in the direction forming an angle of $\theta_{g0}=15°$ which is emitted from the light guiding plate 7 can be converted into a ray taking a peak in a direction forming an angle of $\theta_0=61°$ which is coincident with the angle of $\theta_{ip}=61°$ (29° with respect to the vertical direction).

Moreover, the optical sheet 17 can be constituted in the following manner. The base portion 12 is formed of poly-p-xylylene (p-xylylene) and has a refractive index of n1=1.669. Referring to the triangular portion 13 of the base portion 12, moreover, an angle of $\theta 11=54.6°$ is formed in the transverse direction of the first side surface 13a and an angle of $\theta 12=90°$ is formed in the transverse direction of the second side surface 13b. The fitting portion 14 is formed of an acryl based resin containing fluorine and the fitting portion 14 has a refractive index of n2=1.40.

With such a structure of the optical sheet 17, a ray taking a peak in the direction forming an angle of $\theta_{go}=15°$ which is emitted from the light guiding plate 7 can be converted into a ray taking a peak in a direction forming an angle of $\theta_0=71°$ (19° in the vertical direction). By combining the prism sheet 9 having an optimum direction of incidence forming an angle of $\theta_{ip}=71°$, it is possible to emit a ray taking a peak in almost the just upward direction from the upper portion of the prism sheet 9.

While the example in which one prism sheet 9 is provided on the optical sheet 17 to constitute the back light unit has been described above, two identical prism sheets 9 may be superposed and provided on the optical sheet 17 to cross each other. More specifically, another identical prism sheet 9 may be provided on the prism sheet 9 shown in FIG. 8 such that the peak lines 9c of the prism portions 9b are orthogonal to each other.

Also in the case in which the back light unit is constituted by a combination of two prism sheets 9, the optical sheet 17 emits the ray in the direction forming an angle of $\theta_{g0}$ shown in FIG. 2 which is emitted from the light guiding plate 7 in an optimum direction for the two combined prism sheets 9.

In the optical sheet 17, the refractive index n1 of the base portion 12 and the refractive index n2 of the fitting portion 14 are set such that a ray can be emitted with an angle of $\theta_{ip}$ in the optimum direction for the lower prism sheet for emitting a ray taking a peak in almost the just upward direction from the upper prism sheet 9 in the two prism sheets 9. Moreover, an angle of θ11 of the first side surface 13a of the base portion 12 is set based on the relationship with the refractive index n1 of the base portion 12.

Description will be given to a specific example of the case in which the back light unit is constituted by a combination of two prism sheets 9. A wedge-shaped light guiding plate having a great directivity described above is used as the light guiding plate 7. The light guiding plate 7 emits a ray having a distribution taking peak in a direction forming an angle of $\theta_{g0}$=15° from an upper surface thereof.

BEF II manufactured by 3M Co., Ltd. is used for the prism sheet 9. When two prism sheets 9 are provided orthogonally to each other and a ray taking a peak in a direction forming an angle of $\theta_{ip}$=39° with respect to the transverse direction B (51° with respect to a vertical direction) is incident through the lower surface of the prism sheet 9 provided on the lower side, a ray taking peak in almost the just upward direction can be emitted from the upper surface of the prism sheet 9 provided on the upper side.

Referring to the optical sheet 17, the base portion 12 is constituted by polycarbonate (PC) and has a refractive index of n1=1.586. Referring to the triangular portion 13 of the base portion 12, moreover, an angle of θ11=52.5° is formed in the transverse direction of the first side surface 13a and an angle of θ12=90° is formed in the transverse direction of the second side surface 13b. The fitting portion 14 is formed of polymethyl methacrylate (PMMA) and the fitting portion 14 has a refractive index of n2=1.479.

With such a structure of the optical sheet 17, the ray taking a peak in the direction forming an angle of $\theta_{g0}$=15° which is emitted from the light guiding plate 7 can be converted into a ray taking a peak in a direction forming an angle of $\theta_{ip}$=39° which is an optimum direction for the two superposed prism sheets 9.

Figure 11A:
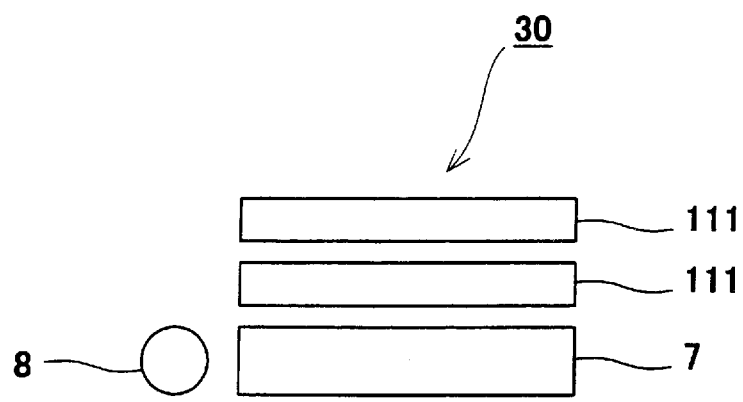
FIG. 11($a$) is a view showing the structure of a back light unit in which the optical sheet according to the present invention is incorporated.

In order to constitute the back light unit by using the optical sheet according to the present invention, any prism sheet is not used but a plurality of identical optical sheets can be superposed and used. FIG. 11(a) is a view showing the typical structure of the back light unit 30 according to an example of the bark light unit constituted by incorporating a plurality of identical optical sheets.

Figure 11B:
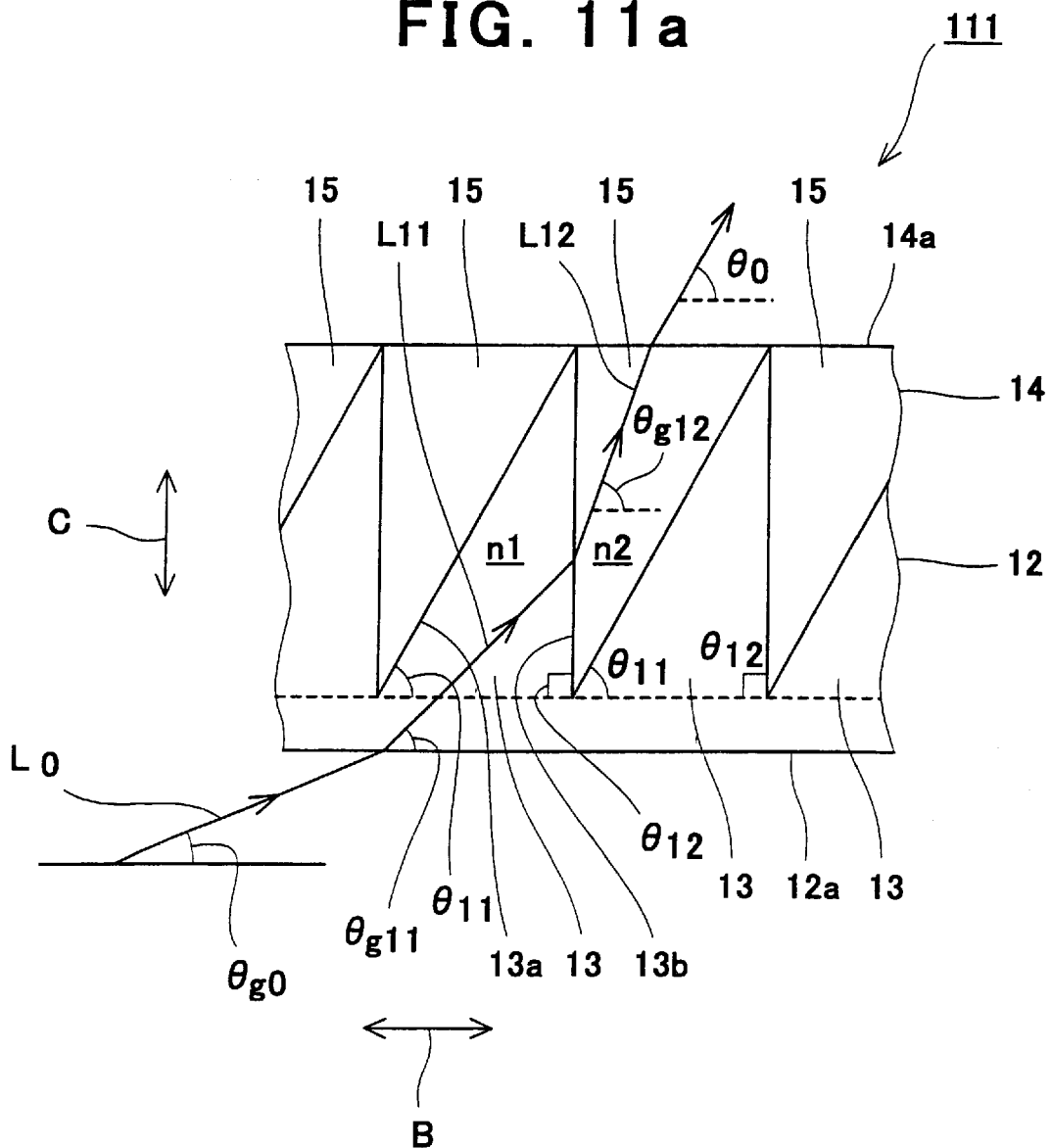
Figure 12:
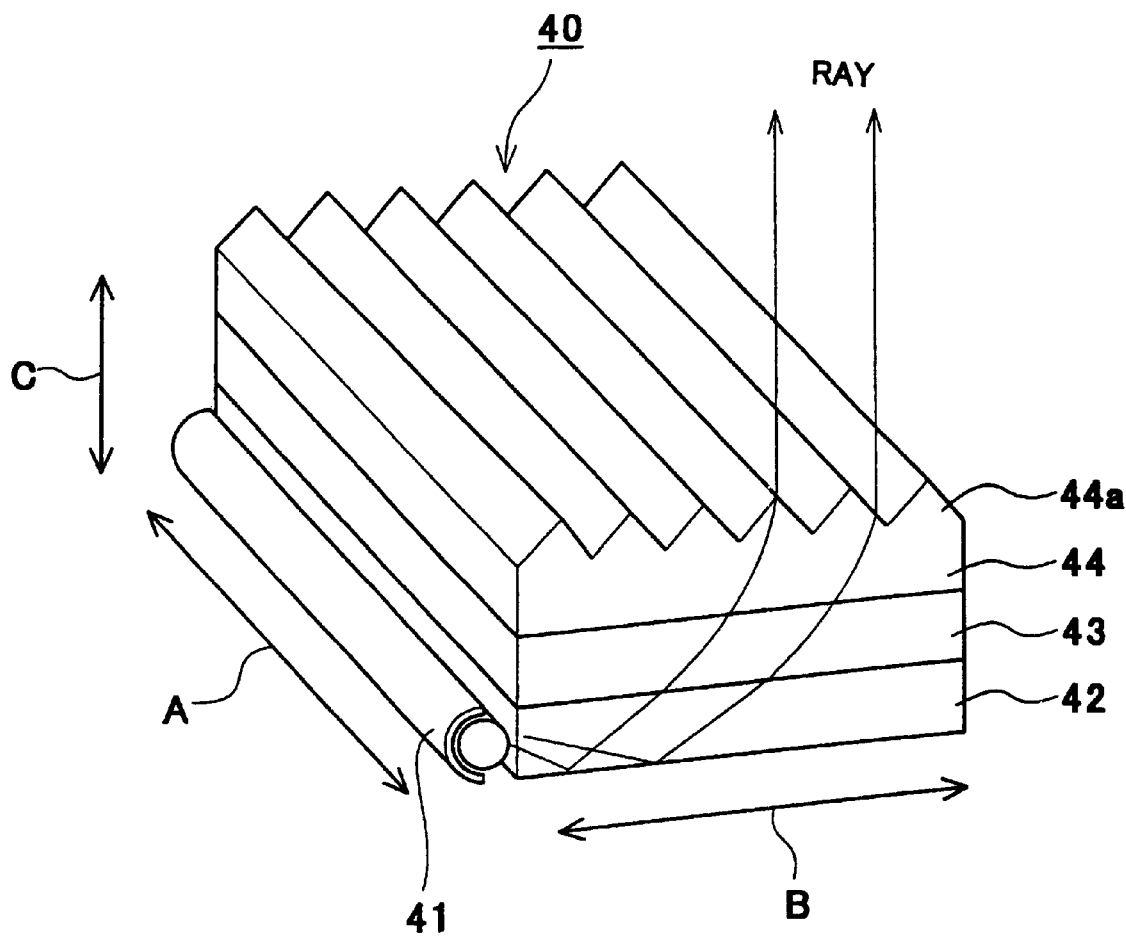
FIG. 12 is a perspective view showing a conventional back light unit.

In the back light unit 30, two optical sheets 111 are superposed and provided vertically on the light guiding plate 7. The optical sheet 111 will be described with referenced to FIG. 11(b). FIG. 11(b) is a partial sectional view showing the optical sheet 111.

The optical sheet 111 is constituted by a base portion 12 and a fitting portion 14. The base portion 12 has such a structure that a large number of triangular portions 13 having a triangular sectional shape are provided in parallel. Moreover, the base portion 12 has a bottom face 12a almost planar shaped. The triangular portion 13 has a first side surface 13a positioned on the left side to be one of sides where the lamp 8 is present in the transverse direction and a second side surface 13b positioned on the right side to be the other side in the transverse direction.

A material for giving a specific refractive index n1 and an angle θ11 formed with respect to the transverse direction of the first side surface 13a are given to the base portion 12 such that the angle θ11 of the first side surface 13a is equal to or greater than an angle $\theta_{g11}$ formed between a direction having the peak of the ray L11 refracted from the lower surface 12a of the base portion 12 and incident on the inside of the base portion 12 and the transverse direction.

The second side surface 13b is formed such that an angle θ12 formed with respect to the transverse direction is almost perpendicular. If the second side surface 13b is formed almost perpendicularly, the optical sheet 111 can be designed easily in the same manner as the optical sheet 17.

The fitting portion 19 is formed on the lower base portion 12 to be fitted therein with less margin and is constituted by a large number of inverted triangular portions 15 to be fitted in the triangular portions 13 of the base portion 12. Moreover, the fitting portion 14 has an upper surface 14a almost planar-shaped. The fitting portion 14 is formed of a material having a refractive index n2 smaller than the refractive index n1 of the base portion 12. Consequently, the ray L12 refracted from the base portion 12 and incident on the fitting portion 14 can be incident from the base portion 12 to more approach the just upward direction ($\theta_{g11} < \theta_{g12}$).

By superposing and providing two optical sheets 111, the ray incident on the lower optical sheet 111 through the light guiding plate 7 can be emitted to more approach the just upward direction than the upper optical sheet 111. Consequently, the refractive index n1 of the base portion 12 and the refractive index n2 of the fitting portion 14 are regulated so that a ray taking a peak in almost the just upward direction can be emitted from the optical sheet 111 provided on the upper side as will be described in the following specific example.

Description will be given to a specific example of the case in which the back light unit is constituted by a combination of two optical sheets 111.

A wedge-shaped light guiding plate having a great directivity described above is used as the light guiding plate 7. The light guiding plate 7 emits a ray having a distribution taking peak in a direction forming an angle of $\theta_{g0}$=15° from an upper surface thereof.

Referring to the optical sheet 111, the base portion 12 is constituted by polycarbonate (PC) and has a refractive index of n1=1.586. Referring to the triangular portion 13 of the base portion 12, moreover, an angle of θ11=52.5° is formed in the transverse direction of the first side surface 13a. The fitting portion 14 is formed of an acryl based on resin containing fluorine and the fitting portion 14 has a refractive index of n2=1.432.

By providing two optical sheets 111 having such a structure, the ray taking a peak in the direction forming an angle of $\theta_{g0}$=15° which is emitted from the light guiding plate 7 can be converted into a ray taking a peak in a direction forming an angle of 86.5° with respect to the transverse direction. In other words, a ray taking a peak in almost the just upward direction can be emitted.

In the case in which two or more optical sheets 111 described above are to be combined and used without using a prism sheet, it is desirable that a difference (that is, n1−n2) in a refractive index between the base portion and the fitting portion should be set to be at least 0.15 or more. Consequently, the ray to be emitted from the optical sheet provided on the upper side can more approach the just upward direction. Moreover, it is desirable that the refractive index of the base portion should be set to n1=1.57 or more. Consequently, a ray taking peak in almost the just upward direction can be emitted from the optical sheet provided on the upper side.

While the example in which the prism sheet is not used but only the optical sheet is used and two optical sheet are superposed and incorporated has been described with reference to FIG. 11, it is possible to obtain a structure using one optical sheet through such adjustment that the difference (n1−n2) between the refractive index n1 of the base portion and the refractive index n2 of the fitting portion is much greater than that in the case in which two optical sheets are used. In other words, the ray incident on the light guiding plate can more approach the just upward direction with an increase in the difference in the refractive index between the base portion and the fitting portion. In this case, it is desirable that the difference between the refractive index n1 of the base portion and the refractive index n2 of the fitting portion should be set to be at least 0.3 or more. It is more desirable that the refractive index of the base portion n1 should be set to be 1.6 or more. Consequently, the ray taking the peak in almost the just upward direction can be emitted from the optical sheet.

Referring to the optical sheet according to the present invention in which the refractive index of the fitting portion is set to be smaller than that of the base portion and the second side surface 13b is formed almost perpendicularly to the transverse direction, a combination shown in Table 1 can also be employed for the refractive indices of the base portion and the fitting portion. The Table 1 shows the combination of the refractive index (n1) of the base portion and the refractive index (n2) of the fitting portion in the optical sheet and a direction ($\theta_0$) taking a peak of a ray emitted from the optical sheet. Each sample shown in the Table 1 has $\theta_0$ obtained in the case in which lower and upper surfaces are almost planar-shaped and the ray taking the peak of the distribution in the direction forming an angle of $\theta_{g0}=15°$ is incident on the lower surface.

TABLE 1

|  | n1 | n2 | $\theta_o$ (°) |
|---|---|---|---|
| Sample 1 | 1.479 | 1.45 | 23 |
| Sample 2 | 1.479 | 1.4 | 33 |
| Sample 3 | 1.586 | 1.5 | 36 |
| Sample 4 | 1.586 | 1.45 | 44 |
| Sample 5 | 1.586 | 1.44 | 44.5 |
| Sample 6 | 1.586 | 1.4 | 52 |
| Sample 7 | 1.669 | 1.363 | 85.8 |
| Sample 8 | 1.669 | 1.5 | 51 |
| Sample 9 | 1.669 | 1.479 | 55 |
| Sample 10 | 1.669 | 1.45 | 60 |

The samples 1 and 2 in the Table 1 can be formed of polymethyl methacrylate (PMMA) to obtain the refractive index of the base portion of n1=1.479. Moreover, the samples 3 to 6 can be formed of polycarbonate (PC) to obtain the refractive index of the base portion of n1=1.586. Furthermore, the samples 7 to 10 can be formed of poly-p-xylylene (p-xylylene) to obtain the refractive index of the base portion of n1=1.669.

Moreover, the samples 1, 4 and 10 can be formed of an acryl based resin containing fluorine to obtain the refractive index of the fitting portion of n2=1.45. Furthermore, the samples 2 and 6 can be formed of the acryl based resin containing fluorine to obtain the refractive index of the fitting portion of n2=1.4.

Furthermore, the samples 3 and 8 can be formed of an acryl based resin to obtain the refractive index of the fitting portion of n2=1.5. Moreover, the sample 5 can be formed of the acryl based resin containing fluorine to obtain the refractive index of the fitting portion of n2=1.44.

In addition, the sample 7 can be formed of the acryl based resin containing fluorine to obtain the refractive index of the base portion of n2=1.363.

Referring to the sample 7 of the optical sheet shown in the Table 1, a ray taking a peak in almost the just upward direction can be emitted from one optical sheet. Referring to the samples 9 and 10, the ray taking the peak in almost the just upward direction can be emitted by using two or more optical sheets which are superposed.

Referring to the other samples, the back light unit can be constituted by a combination of one or two prism sheets in which the outgoing direction of $\theta_0$ of each sample is coincident with the optimum incidence direction $\theta_{ip}$.

For the optical sheet described above, a light diffusing layer may be provided on the fitting portion. When the light diffusing layer is provided, it is possible to prevent an undesirable luminance unevenness of light from being projected onto a liquid crystal screen through the diffusion of a ray to be emitted upward from the optical sheet. Moreover, the direction of the peak of the ray emitted upward from the optical sheet can be caused to more approach the just upward direction through the diffusion of the ray. For such a light diffusing layer, a well-known light diffusing layer can be provided. The light diffusing layer may be formed of particles having a light diffusing property such as beads and a binder, and concavo-convex portions are formed by an embossed shape, thereby diffusing light.

For the optical sheet described above, a sticking preventing layer may be provided under the base portion. Consequently, in the case in which the back light unit is to be constituted, the optical sheet can come in contact with the light guiding plate through the sticking preventing layer so that an image of glittering light can be prevented from being projected onto the liquid crystal screen. When the beads are provided apart from each other under the base portion, the sticking preventing layer can be formed.

While the example in which the optical sheet is provided just above the light guiding plate to constitute the back light unit has been described above with reference to the drawings, the optical sheet is not provided just above the light guiding plate but may be provided relatively above the light guiding plate.

More specifically, in the case in which the optical sheet according to the present invention is used by a combination with the prism sheet, it is possible to emit a ray taking a peak in a direction forming a specific output angle to be the optimum incidence direction for the prism sheet if a ray taking a peak in a direction forming a specific angle of incidence is incident from the lower side of the optical sheet.

Moreover, in the case in which the optical sheet according to the present invention is used without a combination with the prism sheet, a ray incident from the lower side of the optical sheet can be emitted as a ray taking a peak in almost the just upward direction if the optical sheet is positioned relatively above the light guiding plate.

Industrial Applicability

According to the optical sheet of the present invention, it is possible to guide a ray to more approach almost the just upward direction to be a direction of a front face of a liquid crystal screen. By adjusting the refractive indices of the base portion and the fitting portion, a ray can also be guided in a specific direction to be intended or in almost the just upward direction. Consequently, since the ray can be guided with a high efficiency for a light source, the number of parts constituting the back light unit can be reduced. Moreover, the optical sheet of the present invention is formed by the base portion and the fitting portion and does not have a corner portion exposed to the outside. Thus, it is possible to obtain the effect that the optical sheet is damaged with difficulty and can be handled easily in a work for assembling the back light unit and yield can be enhanced.

What is claimed is:

1. An optical sheet in which a ray having a distribution peak propagating obliquely in an upward direction forming a specific angle with respect to a lower surface of the optical sheet is incident from a transverse direction, the optical sheet comprising:

a base portion on the lower surface and a fitting portion forming an upper surface of the optical sheet, where the base portion and the fitting portion are formed in parallel and without substantial margin therebetween and the base portion and the fitting portion are formed of materials having different refractive indices, the base portion having a plurality of prisms, each prism defining a triangular portion in one plane and the prisms extending in parallel in a plane normal to the one plane, each triangular portion having a first side surface and a second side surface, and the first side surface forming a base angle with the transverse direction that is equal to or greater than an angle formed between a direction of a ray refracted from the lower surface of the base portion and incident on an inside of the base portion and the transverse direction, such that a ray refracted through the second side surface and into the fitting portion after transmitting through the base portion propagates in a direction closer to the upward direction than a ray transmitted through the base portion incident upon the second side surface, wherein the second side surface forms a base angle with the transverse direction that is at least 70°, and wherein the base angle between the second side surface and the transverse direction is larger than the base angle between the first side surface and the transverse direction.

2. An optical sheet in which a ray having a distribution peak propagating obliquely in an upward direction forming a specific angle with respect to a lower surface of the optical sheet is incident from a transverse direction, the optical sheet comprising:

a base portion on the lower surface and a fitting portion forming an upper surface of the optical sheet, where the base portion and the fitting portion are formed in parallel and without substantial margin therebetween, and the base portion and the fitting portion are formed of materials having different refractive indices, the base portion having a plurality of prisms, each prism defining a triangular portion in one plane and the prisms extending in parallel in a plane normal to the one plane, each triangular portion having a first side surface and a second side surface, the first side surface forming a base angle with the transverse direction that is equal to or greater than an angle formed between a direction of a ray refracted from the lower surface of the base portion and incident on an inside of the base portion and the transverse direction, a refractive index of a material forming the fitting portion is set to be smaller than that of a material forming the base portion, and a gradient of the second side surface has a greater angle formed in the transverse direction than a gradient which is perpendicular to a direction taking a peak of a ray transmitted to the second side surface through the inside of the base portion, such that a ray refracted and incident on the fitting portion after transmitting through the base portion approaches a more upward direction than a ray transmitted through the base portion, wherein the second side surface forms a base angle with the transverse direction that is at least 70°, and wherein the base angle between the second side surface and the transverse direction is larger than the base angle between the first side surface and the transverse direction.

3. An optical sheet in which a ray having a distribution peak propagating obliquely in an upward direction forming a specific angle with respect to a lower surface of the optical sheet is incident from one of sides in a transverse direction, the optical sheet comprising:

a base portion on the lower surface and a fitting portion forming an upper surface of the optical sheet, where the base portion and the fitting portion are formed in parallel and without substantial margin therebetween and the base portion and the fitting portion are formed of materials having different refractive indices, the base portion having a plurality of triangular portions parallel in shape, each triangular portion having a first side surface and a second side surface, and the first side surface forming a base angle with the transverse direction that is equal to or greater than an angle formed between a direction of a ray refracted from the lower surface of the base portion and incident on an inside of the base portion and the transverse direction, the refractive index of the material forming the fitting portion is set to be smaller than that of the material forming the base portion, and the second side surface has a gradient which is almost perpendicular to the transverse direction such that a ray refracted through the second side surface and into the fitting portion after transmitting through the base portion propagates in a direction closer to the upward direction than a ray transmitted through the base portion incident upon the second side surface, wherein the second side surface forms a base angle with the transverse direction that is at least 70°, and wherein the base angle between the second side surface and the transverse direction is larger than the base angle between the first side surface and the transverse direction.

4. An optical sheet in which a ray having a distribution peak propagating obliquely in an upward direction forming a specific angle with respect to a lower surface of the optical sheet is incident from a transverse direction, the optical sheet comprising:

a base portion on the lower surface and a fitting portion forming an upper surface of the optical sheet, where the base portion and the fitting portion are formed in parallel and without substantial margin therebetween, and the base portion and the fitting portion are formed of materials having different refractive indices, the base portion having a plurality of prisms, each prism defining a triangular portion in one plane and the prisms extending in parallel in a plane normal to the one plane, each triangular portion having a first side surface and a second side surface, the first side surface forming a base angle with the transverse direction that is equal to or greater than an angle formed between a direction of a ray refracted from the lower surface of the base portion and incident on an inside of the base portion and the transverse direction, a refractive index of a material forming the fitting portion is set to be smaller than that of a material forming the base portion, the second side surface has a gradient which is almost perpendicular to the transverse direction, and the refractive index of the base portion and that of the fitting portion are mutually adjusted such that a ray having a direction along an angle of incidence is emitted as a ray having a direction along an output angle, such that a ray refracted and incident on the fitting portion after transmitting through the base portion approaches a more upward direction than a ray transmitted through the base portion, wherein the second side surface forms a base angle with the transverse direction that is at least 70°, and wherein the base angle between the second side surface and the transverse direction is larger than the base angle between the first side surface and the transverse direction.

5. An optical sheet in which a ray having a distribution peak propagating obliquely in an upward direction forming a specific angle with respect to a lower surface of the optical sheet is incident from a transverse direction, the optical sheet comprising:

a base portion on the lower surface and a fitting portion forming an upper surface of the optical sheet, where the base portion and the fitting portion are formed in parallel and without substantial margin therebetween, and the base portion and the fitting portion are formed of materials having different refractive indices, the base portion having a plurality of prisms, each prism defining a triangular portion in one plane and the prisms extending in parallel in a plane normal to the one plane, each triangular portion having a first side surface and a second side surface, the first side surface forming a base angle with the transverse direction that is equal to or greater than an angle formed between a direction of a ray refracted from the lower surface of the base portion and incident on an inside of the base portion and the transverse direction, a refractive index of a material forming the fitting portion is set to be smaller than that of a material forming the base portion, the second side surface has a gradient which is almost perpendicular to the transverse direction, and a difference between the refractive index of the base portion and that of the fitting portion is set to be 0.15 or more, such that a ray refracted and incident on the fitting portion after transmitting through the base portion approaches a more upward direction than a ray transmitted through the base portion, wherein the second side surface forms a base angle with the transverse direction that is at least 70°, and wherein the base angle between the second side surface and the transverse direction is larger than the base angle between the first side surface and the transverse direction.

6. An optical sheet in which a ray having a distribution peak propagating obliquely in an upward direction forming a specific angle with respect to a lower surface of the optical sheet is incident from a transverse direction, the optical sheet comprising:

a base portion on the lower surface and a fitting portion forming an upper surface of the optical sheet, where the base portion and the fitting portion are formed in parallel and without substantial margin therebetween, and the base portion and the fitting portion are formed of materials having different refractive indices, the base portion having a plurality of prisms, each prism defining a triangular portion in one plane and the prisms extending in parallel in a plane normal to the one plane, each triangular portion having a first side surface and a second side surface, the first side surface forming a base angle with the transverse direction that is equal to or greater than an angle formed between a direction of a ray refracted from the lower surface of the base portion and incident on an inside of the base portion and the transverse direction, a refractive index of a material forming the fitting portion is set to be smaller than that of a material forming the base portion, the second side surface has a gradient which is almost perpendicular to the transverse direction, and the refractive index of the base portion is set to be 1.57 or more and a difference between the refractive index of the base portion and that of the fitting portion is set to be 0.15 or more, such that a ray refracted and incident on the fitting portion after transmitting through the base portion approaches a more upward direction than a ray transmitted through the base portion, wherein the second side surface forms a base angle with the transverse direction that is at least 70°, and wherein the base angle between the second side surface and the transverse direction is larger than the base angle between the first side surface and the transverse direction.

7. An optical sheet in which a ray having a distribution peak propagating obliquely in an upward direction forming a specific angle with respect to a lower surface of the optical sheet is incident from a transverse direction, the optical sheet comprising:

a base portion on the lower surface and a fitting portion forming an upper surface of the optical sheet, where the base portion and the fitting portion are formed in parallel and without substantial margin therebetween, and the base portion and the fitting portion are formed of materials having different refractive indices, the base portion having a plurality of prisms, each prism defining a triangular portion in one plane and the prisms extending in parallel in a plane normal to the one plane, each triangular portion having a first side surface and a second side surface, the first side surface forming a base angle with the transverse direction that is equal to or greater than an angle formed between a direction of a ray refracted from the lower surface of the base portion and incident on an inside of the base portion and the transverse direction, a refractive index of a material forming the fitting portion is set to be smaller than that of a material forming the base portion, the second side surface has a gradient which is almost perpendicular to the transverse direction, the refractive index of the base portion is set to be 1.57 or more and a difference between the refractive index of the base portion and that of the fitting portion is set to be 0.15 or more, and the base portion is formed of a thermoformable plastic material, such that a ray refracted and incident on the fitting portion after transmitting through the base portion approaches a more upward direction than a ray transmitted through the base portion, wherein the second side surface forms a base angle with the transverse direction that is at least 70°, and wherein the base angle between the second side surface and the transverse direction is larger than the base angle between the first side surface and the transverse direction.

8. An optical sheet in which a ray having a distribution peak propagating obliquely in an upward direction forming a specific angle with respect to a lower surface of the optical sheet is incident from a transverse direction, the optical sheet comprising:

a base portion on the lower surface and a fitting portion forming an upper surface of the optical sheet, where the base portion and the fitting portion are formed in parallel and without substantial margin therebetween, and the base portion and the fitting portion are formed of materials having different refractive indices, the base portion having a plurality of prisms, each prism defining a triangular portion in one plane and the prisms extending in parallel in a plane normal to the one plane, each triangular portion having a first side surface and a second side surface, the first side surface forming a base angle with the transverse direction that is equal to or greater than an angle formed between a direction of a ray refracted from the lower surface of the base portion and incident on an inside of the base portion and the transverse direction, a refractive index of a material forming the fitting portion is set to be smaller than that of a material forming the base portion, the second side surface has a gradient which is almost perpendicular to the transverse direction, the refractive index of the base portion is set to be 1.57 or more and a difference between the refractive index of the base portion and that of the fitting portion is set to be 0.15 or more, and the base portion is formed of a thermoformable plastic material and the thermoformable plastic material is a polycarbonate based resin, such that a ray refracted and incident on the fitting portion after transmitting through the base portion approaches a more upward direction than a ray transmitted through the base portion, wherein the second side surface forms a base angle with the transverse direction that is at least 70°, and wherein the base angle between the second side surface and the transverse direction is larger than the base angle between the first side surface and the transverse direction.

9. An optical sheet in which a ray having a distribution peak propagating obliquely in an upward direction forming a specific angle with respect to a lower surface of the optical sheet is incident from a transverse direction, the optical sheet comprising:

a base portion on the lower surface and a fitting portion forming an upper surface of the optical sheet, where the base portion and the fitting portion are formed in parallel and without substantial margin therebetween, and the base portion and the fitting portion are formed of materials having different refractive indices, the base portion having a plurality of prisms, each prism defining a triangular portion in one plane and the prisms extending in parallel in a plane normal to the one plane, each triangular portion having a first side surface and a second side surface, the first side surface forming a base angle with the transverse direction that is equal to or greater than an angle formed between a direction of a ray refracted from the lower surface of the base portion and incident on an inside of the base portion and the transverse direction, a refractive index of a material forming the fitting portion is set to be smaller than that of a material forming the base portion, the second side surface has a gradient which is almost perpendicular to the transverse direction, and a difference between the refractive index of the base portion and that of the fitting portion is set to be 0.3 or more, such that a ray refracted and incident on the fitting portion after transmitting through the base portion approaches a more upward direction than a ray transmitted through the base portion, wherein the second side surface forms a base angle with the transverse direction that is at least 70°, and wherein the base angle between the second side surface and the transverse direction is larger than the base angle between the first side surface and the transverse direction.

10. An optical sheet in which a ray having a distribution peak propagating obliquely in an upward direction forming a specific angle with respect to a lower surface of the optical sheet is incident from a transverse direction, the optical sheet comprising:

a base portion on the lower surface and a fitting portion forming an upper surface of the optical sheet, where the base portion and the fitting portion are formed in parallel and without substantial margin therebetween, and the base portion and the fitting portion are formed of materials having different refractive indices, the base portion having a plurality of prisms, each prism defining a triangular portion in one plane and the prisms extending in parallel in a plane normal to the one plane, each triangular portion having a first side surface and a second side surface, the first side surface forming a base angle with the transverse direction that is equal to or greater than an angle formed between a direction of a ray refracted from the lower surface of the base portion and incident on an inside of the base portion and the transverse direction, a refractive index of a material forming the fitting portion is set to be smaller than that of a material forming the base portion, the second side surface has a gradient which is almost perpendicular to the transverse direction, and the refractive index of the base portion is set to be 1.6 or more and a difference between the refractive index of the base portion and that of the fitting portion is set to be 0.3 or more, such that a ray refracted and incident on the fitting portion after transmitting through the base portion approaches a more upward direction than a ray transmitted through the base portion, wherein the second side surface forms a base angle with the transverse direction that is at least 70°, and wherein the base angle between the second side surface and the transverse direction is larger than the base angle between the first side surface and the transverse direction.

11. An optical sheet in which a ray having a distribution peak propagating obliquely in an upward direction forming a specific angle with respect to a lower surface of the optical sheet is incident from a transverse direction, the optical sheet comprising:

a base portion on the lower surface and a fitting portion forming an upper surface of the optical sheet, where the base portion and the fitting portion are formed in parallel and without substantial margin therebetween, and the base portion and the fitting portion are formed of materials having different refractive indices, the base portion having a plurality of prisms, each prism defining a triangular portion in one plane and the prisms extending in parallel in a plane normal to the one plane, each triangular portion having a first side surface and a second side surface, the first side surface forming a base angle with the transverse direction that is equal to or greater than an angle formed between a direction of a ray refracted from the lower surface of the base portion and incident on an inside of the base portion and the transverse direction, a refractive index of a material forming the fitting portion is set to be smaller than that of a material forming the base portion, the second side surface has a gradient which is almost perpendicular to the transverse direction, a difference between the refractive index of the base portion and that of the fitting portion is set to be 0.3 or more, and the base portion is formed of a thermoformable plastic material, such that a ray refracted and incident on the fitting portion after transmitting through the base portion approaches a more upward direction than a ray transmitted through the base portion, wherein the second side surface forms a base angle with the transverse direction that is at least 70°, and wherein the base angle between the second side surface and the transverse direction is larger than the base angle between the first side surface and the transverse direction.

12. An optical sheet in which a ray having a distribution peak propagating obliquely in an upward direction forming a specific angle with respect to a lower surface of the optical sheet is incident from a transverse direction, the optical sheet comprising:

a base portion on the lower surface and a fitting portion forming an upper surface of the optical sheet, where the base portion and the fitting portion are formed in parallel and without substantial margin therebetween, and the base portion and the fitting portion are formed of materials having different refractive indices, the base portion having a plurality of prisms, each prism defining a triangular portion in one plane and the prisms extending in parallel in a plane normal to the one plane, each triangular portion having a first side surface and a second side surface, the first side surface forming a base angle with the transverse direction that is equal to or greater than an angle formed between a direction of a ray refracted from the lower surface of the base portion and incident on an inside of the base portion and the transverse direction, a refractive index of a material forming the fitting portion is set to be smaller than that of a material forming the base portion, the second side surface has a gradient which is almost perpendicular to the transverse direction, the refractive index of the base portion is set to be 1.6 or more and a difference between the refractive index of the base portion and that of the fitting portion is set to be 0.3 or more, and the base portion is formed of a thermoformable plastic material, such that a ray refracted and incident on the fitting portion after transmitting through the base portion approaches a more upward direction than a ray transmitted through the base portion, wherein the second side surface forms a base angle with the transverse direction that is at least 70°, and wherein the base angle between the second side surface and the transverse direction is larger than the base angle between the first side surface and the transverse direction.

13. An optical sheet in which a ray having a distribution peak propagating obliquely in an upward direction forming a specific angle with respect to a lower surface of the optical sheet is incident from a transverse direction, the optical sheet comprising:

a base portion on the lower surface and a fitting portion forming an upper surface of the optical sheet, where the base portion and the fitting portion are formed in parallel and without substantial margin therebetween, and the base portion and the fitting portion are formed of materials having different refractive indices, the base portion having a plurality of prisms, each prism defining a triangular portion in one plane and the prisms extending in parallel in a plane normal to the one plane, each triangular portion having a first side surface and a second side surface, the first side surface forming a base angle with the transverse direction that is equal to or greater than an angle formed between a direction of a ray refracted from the lower surface of the base portion and incident on an inside of the base portion and the transverse direction, a refractive index of a material forming the fitting portion is set to be smaller than that of a material forming the base portion, the second side surface has a gradient which is almost perpendicular to the transverse direction, and the fitting portion is formed of an acryl based resin, such that a ray refracted and incident on the fitting portion after transmitting through the base portion approaches a more upward direction than a ray transmitted through the base portion, wherein the second side surface forms a base angle with the transverse direction that is at least 70°, and wherein the base angle between the second side surface and the transverse direction is larger than the base angle between the first side surface and the transverse direction.

14. An optical sheet in which a ray having a distribution peak propagating obliquely in an upward direction forming a specific angle with respect to a lower surface of the optical sheet is incident from a transverse direction, the optical sheet comprising:

a base portion on the lower surface and a fitting portion forming an upper surface of the optical sheet, where the base portion and the fitting portion are formed in parallel and without substantial margin therebetween, and the base portion and the fitting portion are formed of materials having different refractive indices, the base portion having a plurality of prisms, each prism defining a triangular portion in one plane and the prisms extending in parallel in a plane normal to the one plane, each triangular portion having a first side surface and a second side surface, the first side surface forming a base angle with the transverse direction that is equal to or greater than an angle formed between a direction of a ray refracted from the lower surface of the base portion and incident on an inside of the base portion and the transverse direction, a refractive index of a material forming the fitting portion is set to be smaller than that of a material forming the base portion, the second side surface has a gradient which is almost perpendicular to the transverse direction, the fitting portion is formed of an acryl based resin, and the acryl based resin for the formation of the fitting portion is an acryl based resin of a radiation polymerization type, such that a ray refracted and incident on the fitting portion after transmitting through the base portion approaches a more upward direction than a ray transmitted through the base portion, wherein the second side surface forms a base angle with the transverse direction that is at least 70°, and wherein the base angle between the second side surface and the transverse direction is larger than the base angle between the first side surface and the transverse direction.

15. An optical sheet in which a ray having a distribution peak propagating obliquely in an upward direction forming a specific angle with respect to a lower surface of the optical sheet is incident from a transverse direction, the optical sheet comprising:

a base portion on the lower surface and a fitting portion forming an upper surface of the optical sheet, where the base portion and the fitting portion are formed in parallel and without substantial margin therebetween, and the base portion and the fitting portion are formed of materials having different refractive indices, the base, portion having a plurality of prisms, each prism defining a triangular portion in one plane and the prisms extending in parallel in a plane normal to the one plane, each triangular portion having a first side surface and a second side surface, the first side, surface forming a base angle with the transverse direction that is equal to or greater than an angle formed between a direction of a ray refracted from the lower surface of the base portion and incident on an inside of the base portion and the transverse direction, a refractive index of a material forming the fitting portion is set to be smaller than that of a material forming the base portion, the second side surface has a gradient which is almost perpendicular to the transverse direction, the fitting portion is formed of an acryl based resin, and the acryl based resin for the formation of the fitting portion is an acryl based resin of a radiation polymerization type and the acryl based resin of the radiation polymerization type contains a fluorine group, such that a ray refracted and incident on the fitting portion after transmitting through the base portion approaches a more upward direction than a ray transmitted through the base portion, wherein the second side surface forms a base angle with the transverse direction that is at least 70°, and wherein the base angle between the second side surface and the transverse direction is larger than the base angle between the first side surface and the transverse direction.

16. The optical sheet according to claim 1 or 3, wherein a light diffusing layer is further provided on the upper surface of the fitting portion.

17. The optical sheet according to claim 1 or 3, wherein a sticking preventing layer having beads apart from each other is provided under the base portion.

* * * * *

UNITED STATES PATENT AND TRADEMARK OFFICE
CERTIFICATE OF CORRECTION

PATENT NO.    : 6,545,827 B1
DATED         : April 8, 2003
INVENTOR(S)   : Motohiko Okabe et al.

It is certified that error appears in the above-identified patent and that said Letters Patent is hereby corrected as shown below:

<u>Column 26,</u>
Line 4, please delete "the base, portion" and insert -- the base portion --.
Line 9, please delete "the first side, surface" and insert -- the first side surface. --

Signed and Sealed this

Twenty-first Day of October, 2003

JAMES E. ROGAN
*Director of the United States Patent and Trademark Office*